US012682421B2

(12) United States Patent
Chapdelaine-Couture et al.

(10) Patent No.: US 12,682,421 B2
(45) Date of Patent: Jul. 14, 2026

(54) CONTEXT-BASED SELECTION OF PERSPECTIVE CORRECTION OPERATIONS

(71) Applicant: Apple Inc., Cupertino, CA (US)

(72) Inventors: Vincent Chapdelaine-Couture, Carignan (CA); Emmanuel Piuze-Phaneuf, Los Gatos, CA (US); Julien Monat Rodier, San Francisco, CA (US); Hermannus J. Damveld, Santa Clara, CA (US); Xiaojin Shi, Cupertino, CA (US); Sebastian Gaweda, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 18/371,872

(22) Filed: Sep. 22, 2023

(65) Prior Publication Data

US 2024/0112303 A1     Apr. 4, 2024

Related U.S. Application Data

(60) Provisional application No. 63/409,327, filed on Sep. 23, 2022.

(51) Int. Cl.
    *G06T 5/00*      (2024.01)
    *G06T 5/50*      (2006.01)
    *G06T 7/246*     (2017.01)

(52) U.S. Cl.
    CPC .................. *G06T 5/00* (2013.01); *G06T 5/50* (2013.01); *G06T 7/248* (2017.01)

(58) Field of Classification Search
    CPC .............. G06T 5/00; G06T 7/248; G06T 5/50
    See application file for complete search history.

(56) References Cited

U.S. PATENT DOCUMENTS 11,301,969 B1     4/2022  Moinul et al.

FOREIGN PATENT DOCUMENTS

WO      WO2011046710 A1     4/2011
WO      WO2022005707 A1 *   1/2022  ............... G06T 5/00

OTHER PUBLICATIONS

Extended European Search Report for corresponding EP Appl. No. 26156907.3 dated Apr. 23, 2026, 8 pages.

* cited by examiner

*Primary Examiner* — Vu Le
*Assistant Examiner* — Matthew James Bodnark
(74) *Attorney, Agent, or Firm* — Fernando & Partners, LLP

(57)     ABSTRACT

In some implementations, a method includes: obtaining image data associated with a physical environment; obtaining first contextual information including at least one of first user information associated with a current state of a user of the computing system, first application information associated with a first application being executed by the computing system, and first environment information associated with a current state of the physical environment; selecting a first set of perspective correction operations based at least in part on the first contextual information; generating first corrected image data by performing the first set of perspective correction operations on the image data; and causing presentation of the first corrected image data.

18 Claims, 16 Drawing Sheets

Figure 5B

Motion State Vector 511

| Timestamp 571 | Motion State Descriptor 572 | Translational Movement Value(s) 574 | Angular Movement Value(s) 576 | Misc. 578 |
|---|---|---|---|---|

Eye Tracking Vector 513

| Timestamp 581 | Angular Value(s) 582 | Translational Values 584 | Misc. 586 |
|---|---|---|---|

Pose Char. Vector 515

| Timestamp 591 | Head Pose Descriptor 592A | Translational Values for Head Pose 592B | Rotational Values for Head Pose 592C | Body Pose Descriptor 594A | Translational Values for Body Sections/ Extremities/Limbs/ Joints 594B | Rotational Values for Body Sections/ Extremities/Limbs/ Joints 594C | Misc. 596 |
|---|---|---|---|---|---|---|---|

User Char. Vector 531

| Timestamp 5101 | Motion State Info 5102 | Gaze Direction Info 5104 | Head Pose Info 5106A | Body Pose Info 5106B | Extremity Tracking Info 5106C | Location Info 5108 | Misc. 5109 |
|---|---|---|---|---|---|---|---|

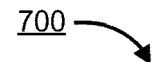

700

| Perspective Correction Operation/Parameter | Parameter Values |
|---|---|
| Depth Clamping Distance 702 | 40 cm, ..., infinity (passthrough) |
| Depth Clamping Surface Type 704 | Planar, spherical, etc. |
| Depth Clamping Surface Orientation 706 | Roll, pitch, and/or yaw rotational values |
| POV Location Correction 708 | X, Y, and/or Z translational offset values |
| Depth Smoothing 710 | • Bilateral filtering vs smoothing across edges<br>• Smoothing kernel size<br>• Foreground vs background stability |
| Depth Resolution 712 | • 0 ppd (passthrough)<br>• 1 ppd (smoothed depth)<br>• 2-3 ppd |
| Depth Framerate 714 | 30, ..., 90 fps |
| Hole Filling 716 | • No holes (smoothed depth)<br>• Black/shadow effect<br>• Color dilation |
| Temporal Warp 718 | 3DOF or 6DOF |
| Misc 720 | ●●● |

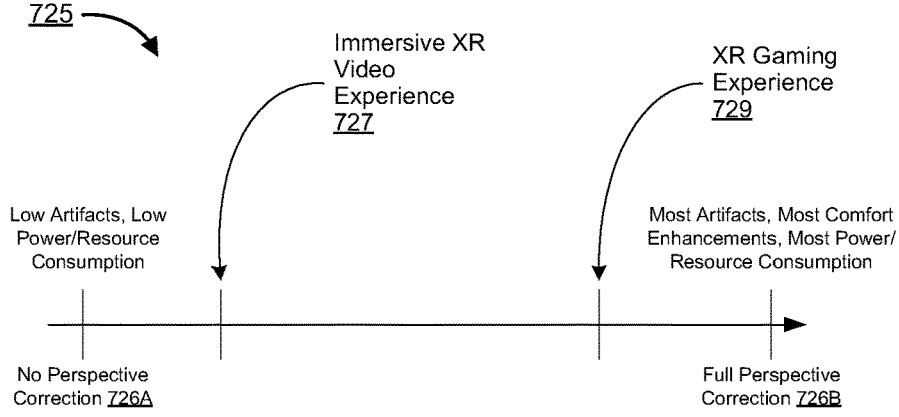

725

Immersive XR Video Experience 727

XR Gaming Experience 729

Low Artifacts, Low Power/Resource Consumption

Most Artifacts, Most Comfort Enhancements, Most Power/ Resource Consumption

No Perspective Correction 726A

Full Perspective Correction 726B

Depth Data 507

Uncorrected Image Data 631

POV Location Correction 708

Corrected Image Data 633

750

| Sceario/Task | Scenario 751A: Watching a movie | Scenario 751B: Crowded meeting place | Scenario 751C: Working at a desk or browsing around a store/museum |
|---|---|---|---|
| Prioritization | Power | Visual Artifacts | Motion Sickness |
| Active Perspective Correction Operations & Parameter Values | • Full POV Loc Correction<br>• 3DOF temporal warp<br>• Infinite clamping distance<br>• 0 ppd depth resolution (no depth estimation) | • Partial POV Loc Correction (X-only)<br>• 6DOF temporal warp<br>• Clamped plane at 70 cm distance<br>• 1.5 ppd depth resolution | • Partial POV Loc Correction (XZ-only)<br>• 6DOF temporal warp<br>• Clamped plane at 70 cm distance<br>• 1.5 ppd depth resolution |
| Potential Motion Sickness | High | Medium | Low |
| Power Usage | Low | High | High |
| Image Quality (aesthetics) | High | High | Medium |
| Hand-eye Coordination | Low | Medium | High |

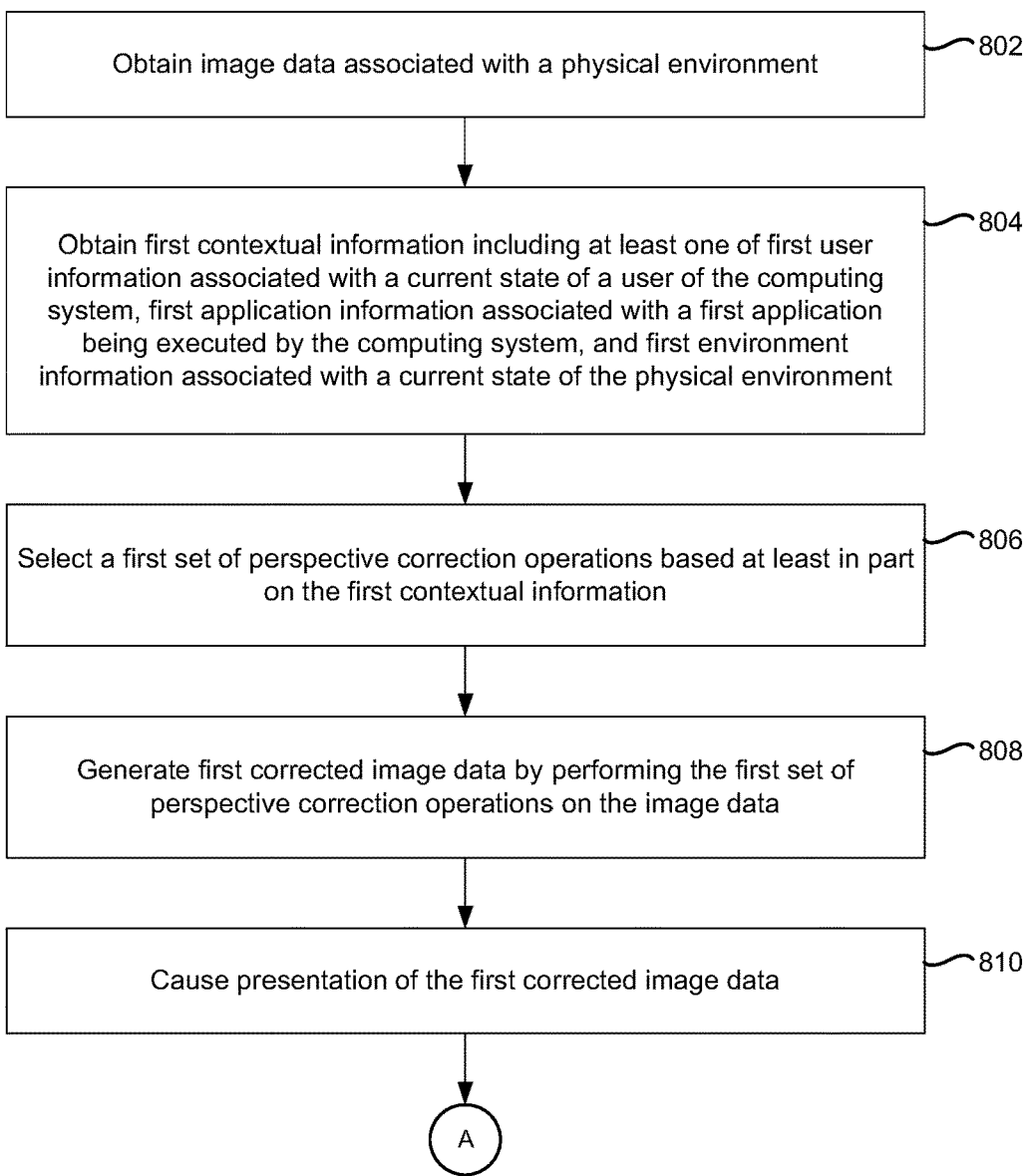

Obtain image data associated with a physical environment — 802

Obtain first contextual information including at least one of first user information associated with a current state of a user of the computing system, first application information associated with a first application being executed by the computing system, and first environment information associated with a current state of the physical environment — 804

Select a first set of perspective correction operations based at least in part on the first contextual information — 806

Generate first corrected image data by performing the first set of perspective correction operations on the image data — 808

Cause presentation of the first corrected image data — 810

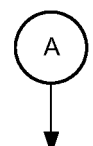

Detect a change from the first contextual information to second contextual information including at least one of second user information associated with the current state of the user of the computing system, second application information associated with a second application different from the first application being executed by the computing system, and second environment information associated with the current state of the physical environment ⟋812

In response to detecting the change from the first contextual information to the second contextual information: ⟋814
    Select a second set of perspective correction operations different from the first set of perspective correction operations on the uncorrected image data;
    Generate second corrected image data by performing the second set of perspective correction operations on the image data; and
    Cause presentation of the second corrected image data

Figure 8B

CONTEXT-BASED SELECTION OF PERSPECTIVE CORRECTION OPERATIONS

CROSS-REFERENCE TO RELATED APPLICATIONS

This application claims priority to U.S. Provisional Patent App. No. 63/409,327, filed on Sep. 23, 2022, which is hereby incorporated by reference in its entirety.

TECHNICAL FIELD

The present disclosure generally relates to perspective correction and, in particular, to systems, methods, and devices associated with context-based selection of perspective correction operations.

BACKGROUND

In various implementations, an extended reality (XR) environment is presented by a head-mounted device (HMD). Various HMDs include a scene camera that captures an image of the physical environment in which the user is present (e.g., a scene) and a display that displays the image to the user. In some instances, this image or portions thereof can be combined with one or more virtual objects to present the user with an XR experience. In other instances, the HMD can operate in a pass-through mode in which the image or portions thereof are presented to the user without the addition of virtual objects. Ideally, the image of the physical environment presented to the user is substantially similar to what the user would see if the HMD were not present. However, due to the different positions of the eyes, the display, and the camera in space, this may not occur, resulting in impaired distance perception, disorientation, and poor hand-eye coordination.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5B illustrates example data structures related to the input processing architecture in FIG. 5A in accordance with some implementations.

FIG. 7A illustrates various perspective correction operations in accordance with some implementations.

FIG. 7C illustrates various perspective correction scenarios in accordance with some implementations.

FIGS. 8A and 8B illustrate a flowchart representation of a method of context-based selection of perspective correction operations in accordance with some implementations.

Figure 1:
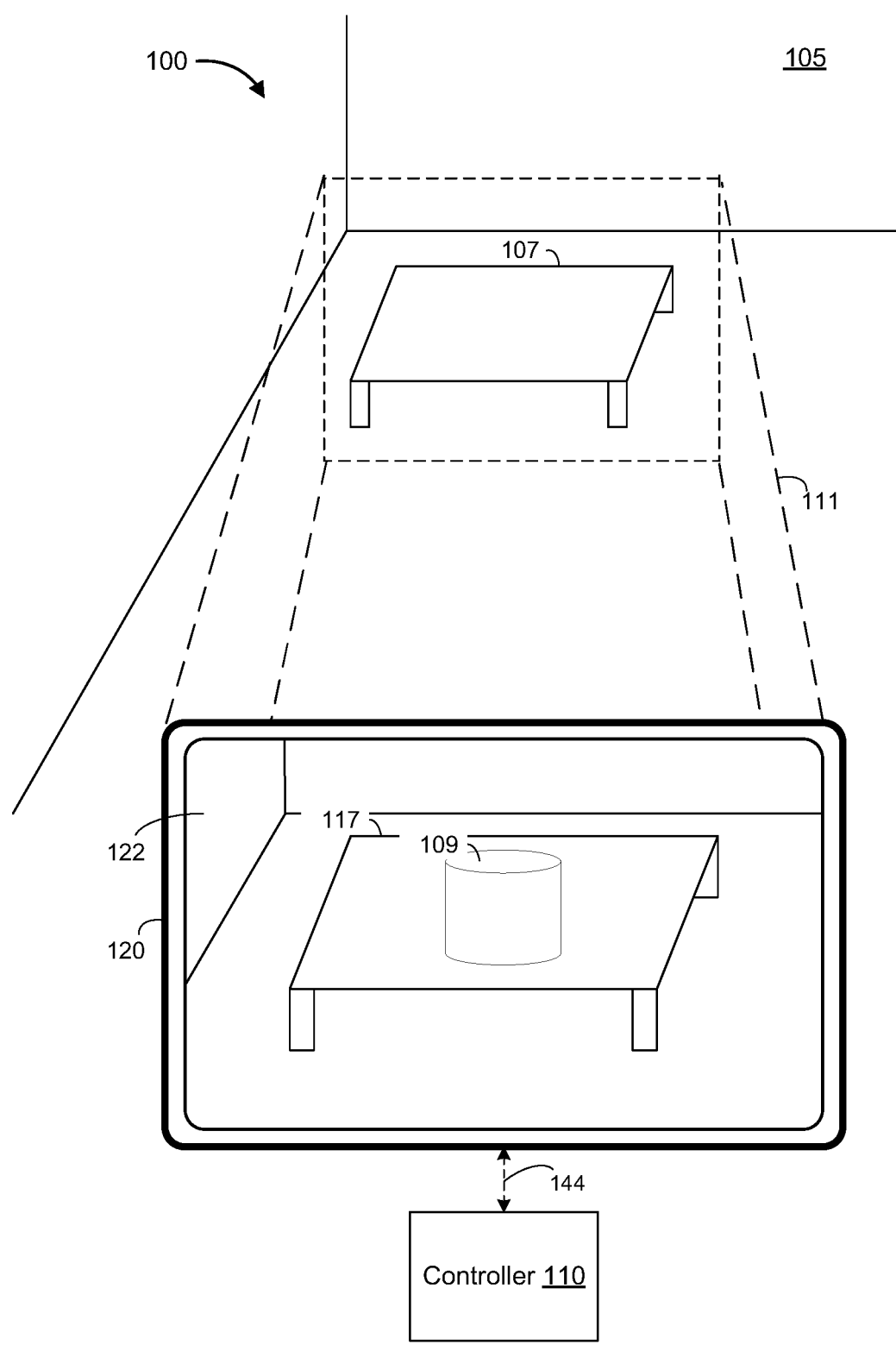
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for context-based selection of perspective correction operations. In some implementations, the method is performed at a computing system including non-transitory memory and one or more processors, wherein the computing system is communicatively coupled to a display device and one or more image sensors via a communication interface. The method includes: obtaining, via the one or more image sensors, image data associated with a physical environment; obtaining first contextual information including at least one of first user information associated with a current state of a user of the computing system, first application information associated with a first application being executed by the computing system, and first environment information associated with a current state of the physical environment; selecting a first set of perspective correction operations based at least in part on the first contextual information; generating first corrected image data by performing the first set of perspective correction operations on the image data; and causing, via the display device, presentation of the first corrected image data.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, in an HMD with a display and a scene camera, the image of the physical environment presented to the user on the display may not always reflect what the user would see if the HMD were not present due to the different positions of the eyes, the display, and the camera in space. In various circumstances, this results in poor distance perception, disorientation of the user, and poor hand-eye coordination, e.g., while interacting with the physical environment.

Various perspective correction operations (also referred to herein as "POV correction modes/operations") are available to enhance the comfort and/or aesthetics of an XR experience such as depth clamping, POV location correction, depth smoothing, hole filling, temporal warping, and/or the like. However, each of the perspective operations modes is associated with various tradeoffs such as potential motion sickness, resource/power consumption, image quality, and/or the like.

As one example, full POV location correction (e.g., correction for each of X, Y, and Z transitional offsets between the user and camera perspectives) may reduce potential motion sickness but introduce image artifacts. As such, in this example, full POV location correction may be appropriate for an immersive video playback experience when the user is in motion. Instead, partial POV location correction (e.g., correction for X or X+Z transitional offsets between the user and camera perspectives) or no POV location correction may be more appropriate when the user is stationary and, in turn, also conserves computing resources/power as opposed to full POV location correction.

Thus, as described herein, a computing system selects a set of perspective correction operations (and sets values for adjustable parameters associated therewith) based on contextual information associated with at least one of: (A) a state of the user, (B) the current application being executed by the computing system, and (C) a state of the physical environment. In some implementations, the computing system may also consider the accuracy of depth information associated with the physical environment, user preferences, user history, etc. when selecting the set of perspective correction operations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience (sometimes also referred to herein as a "XR environment" or a "virtual environment" or a "graphical environment") for the user. In some implementations, the controller 110 includes a suitable combination of software, firmware, and/or hardware. The controller 110 is described in greater detail below with respect to FIG. 9. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content (sometimes also referred to herein as "graphical content" or "virtual content") to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 10. According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
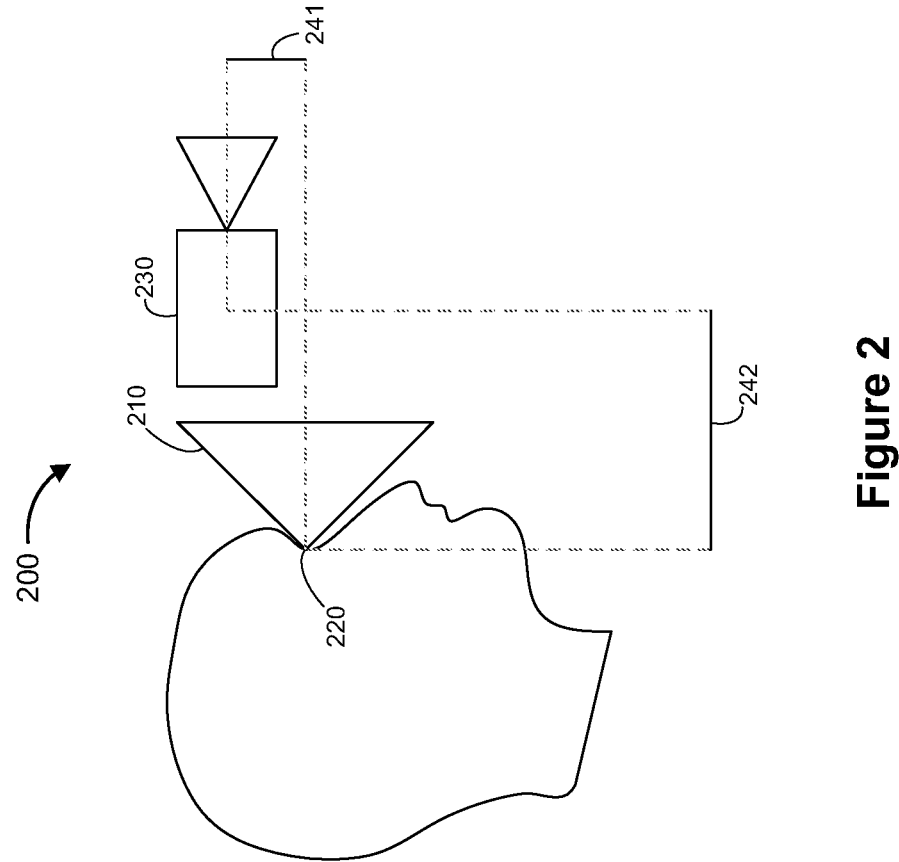
FIG. 2 illustrates an example scenario related to capturing an image of physical environment and displaying the captured image in accordance with some implementations.

FIG. 2 illustrates an example scenario 200 related to capturing an image of an environment and displaying the captured image in accordance with some implementations. A user wears a device (e.g., the electronic device 120 of FIG. 1) including a display 210 and an image sensor 230. The image sensor 230 captures an image of a physical environment and the display 210 displays the image of the physical environment to the eyes 220 of the user. The image sensor 230 has a perspective that is offset vertically from the perspective of the user (e.g., where the eyes 220 of the user are located) by a vertical offset 241. Further, the perspective of the image sensor 230 is offset longitudinally from the perspective of the user by a longitudinal offset 242. Further, in various implementations, the perspective of the image sensor 230 is offset laterally from the perspective of the user by a lateral offset (e.g., into or out of the page in FIG. 2).

Figure 3:
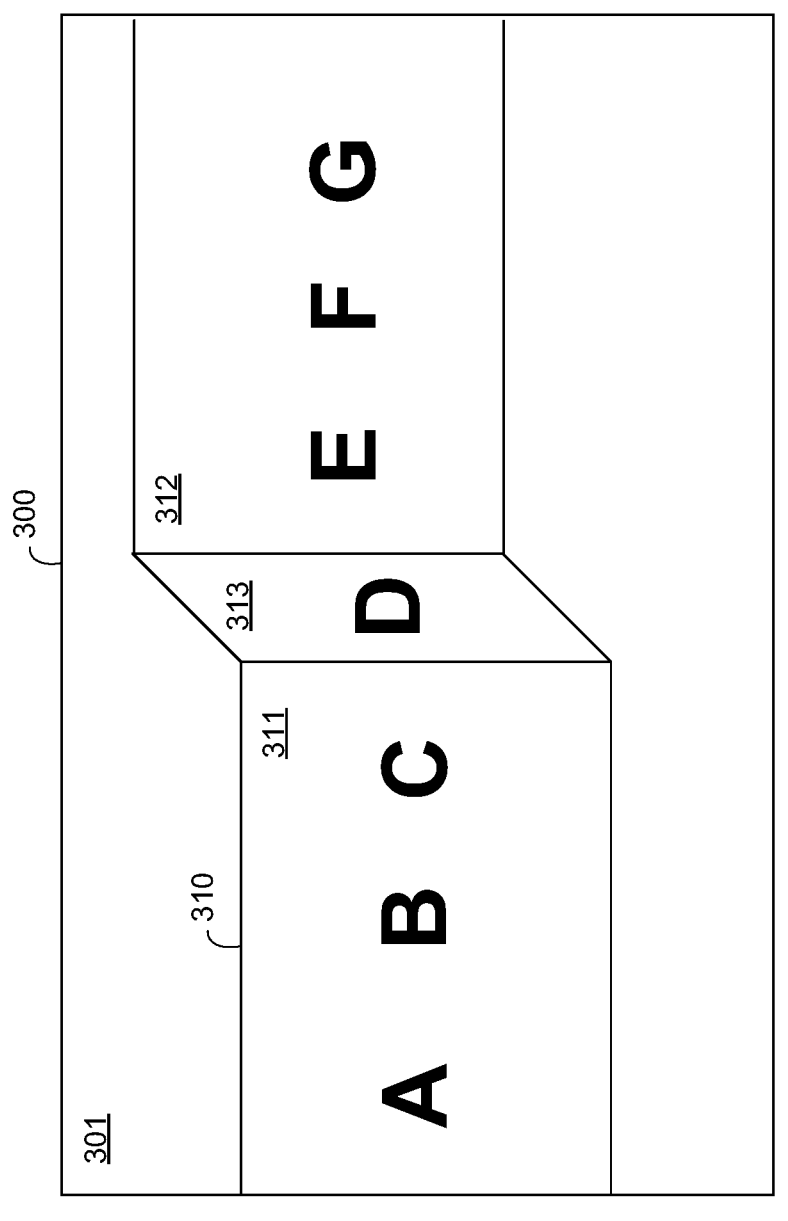
FIG. 3 is an image of physical environment captured by an image sensor from a particular perspective in accordance with some implementations.

FIG. 3 is an image 300 of a physical environment 301 captured by an image sensor from a particular perspective in accordance with some implementations. The physical environment 301 includes a structure 310 having a first surface 311 nearer to the image sensor, a second surface 312 further from the image sensor, and a third surface 313 connecting the first surface 311 and the second surface 312. The first surface 311 has the letters A, B, and C painted thereon, the third surface 313 has the letter D painted thereon, and the second surface 312 has the letters E, F, and G painted thereon.

From the particular perspective, the image 300 includes all of the letters painted on the structure 310. However, from other perspectives, a captured image may not include all the letters painted on the structure 310.

Figure 4:
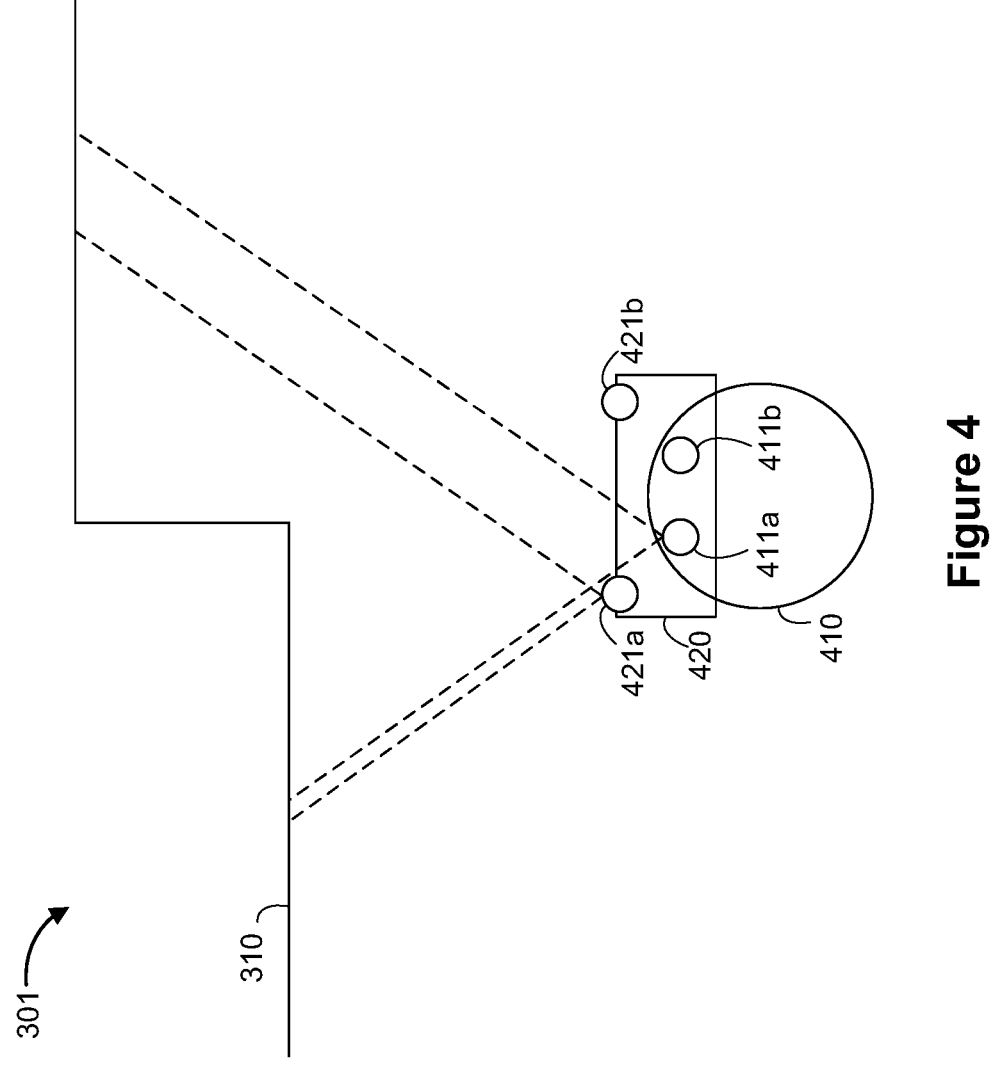
FIG. 4 is an overhead perspective view of the physical environment of FIG. 3 in accordance with some implementations.

FIG. 4 is an overhead perspective view of the physical environment 301 of FIG. 3. The physical environment 301 includes the structure 310 and a user 410 wearing an HMD 420 (e.g., the electronic device 120 in FIG. 1). The user 410 has a left eye 411a at a left eye location providing a left eye perspective. The user 410 has a right eye 411b at a right eye location providing a right eye perspective. The HMD 420 includes a left image sensor 421a at a left image sensor location providing a left image sensor perspective. The HMD 420 includes a right image sensor 421b at a right image sensor location providing a right image sensor perspective. Because the left eye 411a of the user 410 and the left image sensor 421a of the HMD 420 are at different locations, they each provide different perspectives of the physical environment.

Figure 5A:
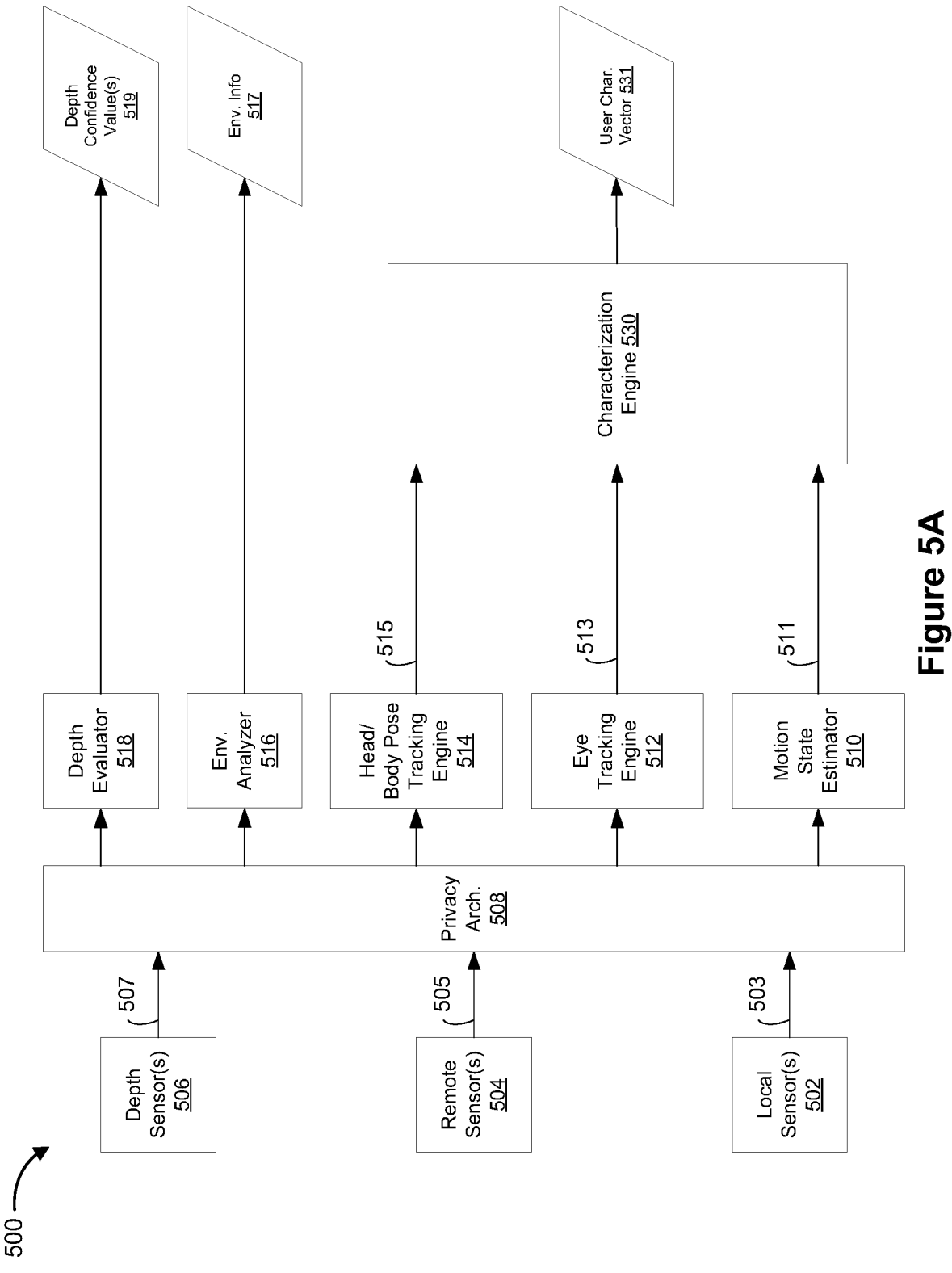
FIG. 5A is a block diagram of an example input processing architecture in accordance with some implementations.

FIG. 5A is a block diagram of an input processing architecture 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the input processing architecture 500 is included in a computing system such as the controller 110 shown in FIGS. 1 and 2; the electronic device 120 shown in FIGS. 1 and 3; and/or a suitable combination thereof.

As shown in FIG. 5A, one or more local sensors 502 of the controller 110, the electronic device 120, and/or a combination thereof obtain local sensor data 503 associated with the physical environment 105 in FIG. 1. For example, the local sensor data 503 includes images or a stream thereof of a user and/or their eyes, images or a stream thereof of the physical environment 105, simultaneous location and mapping (SLAM) information for the physical environment 105 and the location of the electronic device 120 or the user relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 503 includes un-processed or post-processed information.

Similarly, as shown in FIG. 5A, one or more remote sensors 504, associated with the optional remote input devices within the physical environment 105, the control device 130, and/or the like, obtain remote sensor data 505 associated with the physical environment 105 in FIG. 1. For example, the remote sensor data 505 includes images or a stream thereof of the user and/or their eyes, images or a stream thereof of the physical environment 105, SLAM information for the physical environment 105 and the location of the electronic device 120 or the user relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 505 includes un-processed or post-processed information.

In FIG. 5A, one or more depth sensors 506 of the controller 110, the electronic device 120, and/or a combination thereof obtain depth data 507 associated with the physical environment 105. For example, the depth data 507 includes depth values, a depth map, a depth mesh, and/or the like for the physical environment 105. In some implementations, the depth data 507 includes un-processed or post-processed information.

According to some implementations, the privacy architecture 508 ingests the local sensor data 503, the remote sensor data 505, and/or the depth data 507. In some implementations, the privacy architecture 508 includes one or more privacy filters associated with user information and/or identifying information. In some implementations, the privacy architecture 508 includes an opt-in feature where the electronic device 120 informs the user as to what user information and/or identifying information is being monitored and how the user information and/or the identifying information will be used. In some implementations, the privacy architecture 508 selectively prevents and/or limits the input processing architecture 500 or portions thereof from obtaining and/or transmitting the user information. To this end, the privacy architecture 508 receives user preferences and/or selections from the user in response to prompting the user for the same. In some implementations, the privacy architecture 508 prevents the input processing architecture 500 from obtaining and/or transmitting the user information unless and until the privacy architecture 508 obtains informed consent from the user. In some implementations, the privacy architecture 508 anonymizes (e.g., scrambles, obscures, encrypts, and/or the like) certain types of user information. For example, the privacy architecture 508 receives user inputs designating which types of user information the privacy architecture 508 anonymizes As another example, the privacy architecture 508 anonymizes certain types of user information likely to include sensitive and/or identifying information, independent of user designation (e.g., automatically).

According to some implementations, the motion state estimator 510 obtains the local sensor data 503 and the remote sensor data 505 after it has been subjected to the privacy architecture 508. In some implementations, the motion state estimator 510 obtains (e.g., receives, retrieves, or determines/generates) a motion state vector 511 based on the input data and updates the motion state vector 511 over time.

FIG. 5B shows an example data structure for the motion state vector 511 in accordance with some implementations. As shown in FIG. 5B, the motion state vector 511 may correspond to an N-tuple characterization vector or characterization tensor that includes a timestamp 571 (e.g., the most recent time the motion state vector 511 was updated), a motion state descriptor 572 for the electronic device 120 (e.g., stationary, in-motion, car, boat, bus, train, plane, or the like), translational movement values 574 associated with the electronic device 120 (e.g., a heading, a velocity value, an acceleration value, etc.), angular movement values 576 associated with the electronic device 120 (e.g., an angular velocity value, an angular acceleration value, and/or the like for each of the pitch, roll, and yaw dimensions), and/or miscellaneous information 578. One of ordinary skill in the art will appreciate that the data structure for the motion state vector 511 in FIG. 5B is merely an example that may include different information portions in various other implementations and be structured in myriad ways in various other implementations.

According to some implementations, the eye tracking engine 512 obtains the local sensor data 503 and the remote sensor data 505 after it has been subjected to the privacy architecture 508. In some implementations, the eye tracking engine 512 determines/generates an eye tracking vector 513 associated with a gaze direction of the user based on the input data and updates the eye tracking vector 513 over time.

FIG. 5B shows an example data structure for the eye tracking vector 513 in accordance with some implementations. As shown in FIG. 5B, the eye tracking vector 513 may correspond to an N-tuple characterization vector or characterization tensor that includes a timestamp 581 (e.g., the most recent time the eye tracking vector 513 was updated), one or more angular values 582 for a current gaze direction of the user (e.g., roll, pitch, and yaw values), one or more translational values 584 for the current gaze direction of the user (e.g., x, y, and z values relative to the physical environment 105, the world-at-large, and/or the like), and/or miscellaneous information 586. One of ordinary skill in the art will appreciate that the data structure for the eye tracking vector 513 in FIG. 5B is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user is currently looking. As another example, the gaze direction indicates a point (e.g., associated with x, y, and z coordinates relative to the XR environment), an XR object, or a region of interest (ROI) in the XR environment at which the user is currently looking.

According to some implementations, the head/body pose tracking engine 514 obtains the local sensor data 503 and the remote sensor data 505 after it has been subjected to the privacy architecture 508. In some implementations, the head/body pose tracking engine 514 determines/generates a pose characterization vector 515 based on the input data and updates the pose characterization vector 515 over time.

FIG. 5B shows an example data structure for the pose characterization vector 515 in accordance with some implementations. As shown in FIG. 5B, the pose characterization vector 515 may correspond to an N-tuple characterization vector or characterization tensor that includes a timestamp 591 (e.g., the most recent time the pose characterization vector 515 was updated), a head pose descriptor 592A (e.g., upward, downward, neutral, etc.), translational values for the head pose 592B, rotational values for the head pose 592C, a body pose descriptor 594A (e.g., standing, sitting, prone, etc.), translational values for the body pose 594B, rotational values for the body pose 594C, and/or miscellaneous information 596. In some implementations, the pose characterization vector 515 also includes information associated with finger/hand/extremity tracking. One of ordinary skill in the art will appreciate that the data structure for the pose characterization vector 515 in FIG. 5B is merely an example that may include different information portions in various other implementations and be structured in myriad ways in various other implementations.

According to some implementations, the characterization engine 530 obtains the motion state vector 511, the eye tracking vector 513 and the pose characterization vector 515. In some implementations, the characterization engine 530 obtains (e.g., receives, retrieves, or determines/generates) a user characterization vector 531 based on the motion state vector 511, the eye tracking vector 513, and the pose characterization vector 515.

FIG. 5B shows an example data structure for the user characterization vector 531 in accordance with some implementations. As shown in FIG. 5B, the user characterization vector 531 may correspond to an N-tuple characterization vector or characterization tensor that includes a timestamp 5101 (e.g., the most recent time the user characterization vector 531 was updated), motion state information 5102 (e.g., the motion state descriptor 572), gaze direction information 5104 (e.g., a function of the one or more angular values 582 and the one or more translational values 584 within the eye tracking vector 513), head pose information 5106A (e.g., the head pose descriptor 592A), body pose information 5106B (e.g., a function of the body pose descriptor 594A within the pose characterization vector 515), extremity tracking information 5106C (e.g., a function of the body pose descriptor 594A within the pose characterization vector 515 that is associated with extremities of the user that are being tracked by the controller 110, the electronic device 120, and/or a combination thereof), location information 5108 (e.g., a household location such as a kitchen or living room, a vehicular location such as an automobile, plane, etc., and/or the like), and/or miscellaneous information 5109.

According to some implementations, the environment analyzer 516 obtains the local sensor data 503 and the remote sensor data 505 after it has been subjected to the privacy architecture 508. In some implementations, the environment analyzer 516 determines/generates environment information 517 associated with the physical environment 105 and updates the environment information 517 over time. For example, the environment information 517 includes one or more of: a map of the physical environment 105 (e.g., including dimensions for the physical environment 105 and locations for objects therein), a label for the physical environment 105 (e.g., kitchen, bathroom, etc.), labels for one or more objects within the physical environment 105 (e.g., kitchen utensils, food items, clothing items, etc.), a background frequency value, ambient audio information (e.g., volume, audio signatures/fingerprints for one or more ambient sounds, etc.), an ambient light level for the physical environment 105, and/or the like.

According to some implementations, the depth evaluator 518 obtains the depth data 507 after it has been subjected to the privacy architecture 508. In some implementations, the depth evaluator 518 determines/generates depth confidence values 519 for the depth data 507 or separate confidence values for different portions of the depth data 507. For example, if the depth data 507 for the current period changes by more than a predefined tolerance relative to the depth data 507 for a previous time period, the depth data 507 for the current time period may be assigned a low confidence value. As another example, if the depth data 507 includes discontinuities or neighboring values outside of a variance threshold, the depth data 507 may be assigned a low confidence value. As yet another example, if the depth data 507 for a previous time period caused comfort or rendering issues, the depth data 507 for the current time period may be assigned a low confidence value. In this example, comfort may be estimated based on various sensor data such as eye strain (e.g., eye tracking data indicating blinking, squinting, etc.), gaze direction (e.g., indicating that the user is looking away), body pose (e.g., shifting body pose, contorted body pose, etc.), head pose, and/or the like.

Figure 6A:
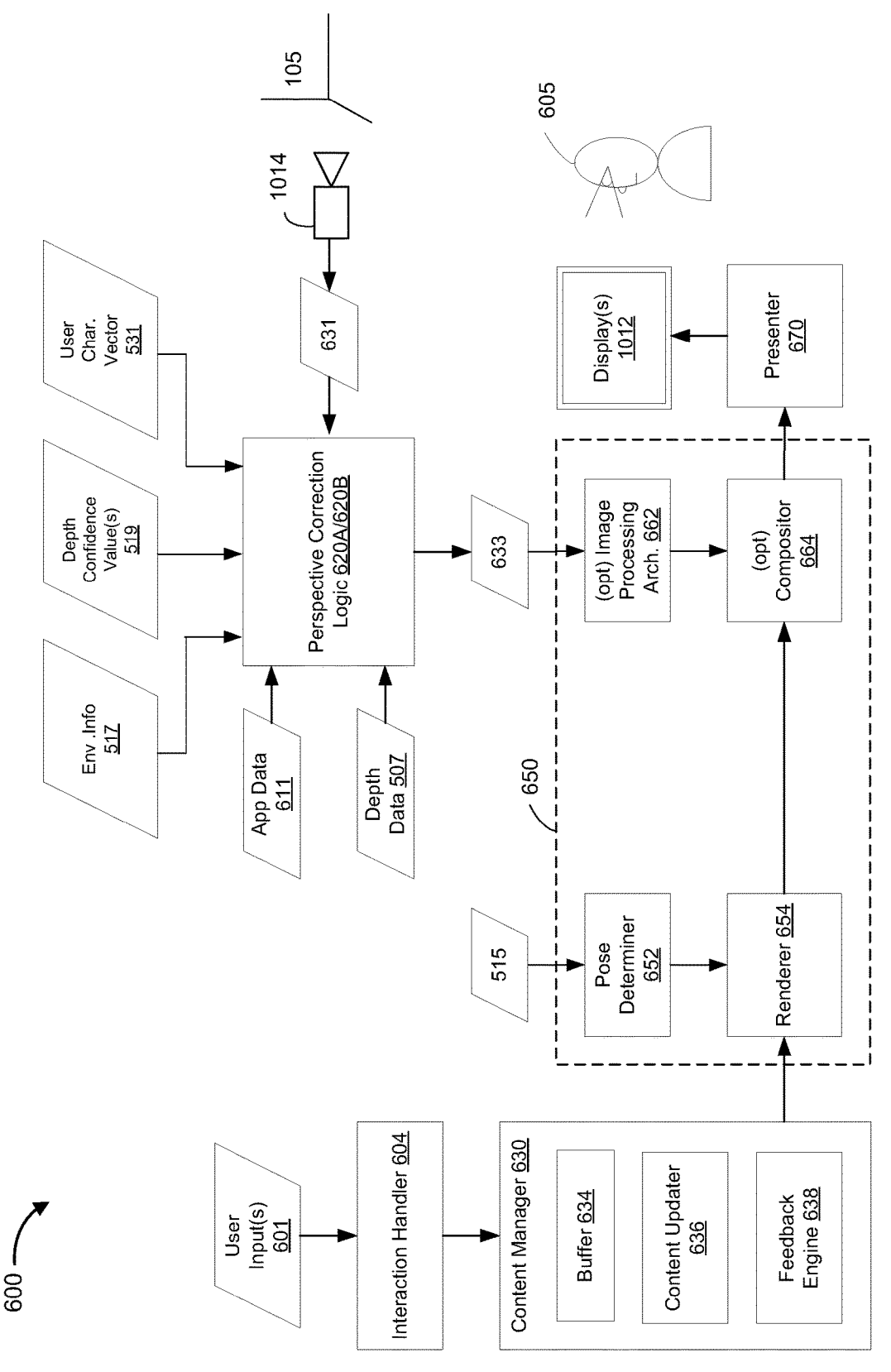
FIG. 6A is a block diagram of an example content delivery architecture in accordance with some implementations.

FIG. 6A is a block diagram of an example content delivery architecture 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture 600 is included in a computing system with one or more processors and non-transitory memory such as the controller 110 shown in FIGS. 1 and 9; the electronic device 120 shown in FIGS. 1 and 10; and/or a suitable combination thereof.

In some implementations, the interaction handler 604 obtains (e.g., receives, retrieves, or detects) one or more user inputs 601 such as eye tracking or gaze-based inputs, hand tracking inputs, touch inputs, voice inputs, and/or the like. In various implementations, the interaction handler 604 determines appropriate modifications to the user interface or the XR environment (e.g., translating an XR object, rotating an XR object, modifying the appearance of an XR object, adding or removing an XR object, and/or the like) based on the one or more user inputs 601.

In various implementations, the content manager 630 manages and updates the layout, setup, structure, and/or the like for the UI or the XR environment, including one or more of VAs, XR content, one or more UI elements associated with the XR content, and/or the like, based on the one or more user inputs 601. To that end, the content manager 630 includes the buffer 634, the content updater 636, and the feedback engine 638.

In some implementations, the buffer 634 includes XR content, a rendered image frame, and/or the like for one or more past instances and/or frames. In some implementations, the content updater 636 modifies the user interface or the XR environment over time based on the one or more other user inputs 601 and/or the like. In some implementations, the feedback engine 638 generates sensory feedback (e.g., visual feedback such as text or lighting changes, audio feedback, haptic feedback, etc.) associated with the user interface or the XR environment based on the one or more other user inputs 601 and/or the like.

According to some implementations, with reference to the rendering engine 650 in FIG. 6A, the pose determiner 652 determines a current camera pose of the electronic device 120 and/or a user 605 relative to the XR environment and/or the physical environment 105 based at least in part on the pose characterization vector 515. In some implementations, the renderer 654 renders the XR content and/or the like according to the current camera pose relative thereto.

According to some implementations, perspective correction logic 620A/620B obtains (e.g., receives, retrieves, generates, captures, etc.) uncorrected image data 631 (e.g., an input image stream) from the one or more image sensors 1014, including one or more images of the physical environment 105 from the current camera pose of the electronic device 120 and/or the user 605. In some implementations, the perspective correction logic 620A/620B generates corrected image data 633 (e.g., an output image stream) by performing one or more perspective correction operations on the uncorrected image data 631. Various perspective correction operations are described in more detail below with reference to FIGS. 7A-7C. In various implementations, the perspective correction logic 620A/620B selects an initial (first) set of perspective correction operations based on one or more of the depth data 507, the environment information 517, the one or more depth confidence values 519, the user characterization vector 531, and application data 611.

In some implementations, the perspective correction logic 620A/620B obtains (e.g., receives, retrieves, generates, determines, etc.) the depth data 507, the environment information 517, the one or more depth confidence values 519, the user characterization vector 531, and application data 611. In some implementations, the perspective correction logic 620A/620B detects a transition trigger based on a change to one of the environment information 517, the user characterization vector 531, and/or application data 611 that satisfies a significance threshold. In some implementations, the perspective correction logic 620A/620B detects a transition trigger when the motion state information 5102 within the user characterization vector 531 is associated with a change that satisfies the significance threshold (e.g., user motion state changes from sitting to walking, or vice versa, or identifying that the user is performing other activities such as climbing stairs or exercising). In some implementations, the perspective correction logic 620A/620B detects a transition trigger when the one or more depth confidence values 519 fall below a depth confidence threshold.

In various implementations, in response to detecting the transition trigger, the perspective correction logic 620A/620B modifies the one or more perspective correction operations. For example, in response to detecting the transition trigger, the perspective correction 620 may transition from performing a first (or initial) set of perspective correction operations to a second set of perspective correction operations different from the first set of perspective correction operations. In one example, the first and second sets of perspective correction operations include at least one overlapping perspective correction operation. In another example, the first and second sets of perspective correction operations include mutually exclusive perspective correction operations. As another example, in response to detecting the transition trigger, the perspective correction logic 620A/620B may modify one or more adjustable parameters associated with the one or more perspective correction operations.

According to some implementations, the optional image processing architecture 662 obtains the corrected image data 633 from the perspective correction logic 620A/620B. In some implementations, the image processing architecture 662 also performs one or more image processing operations on the image stream such as warping, color correction, gamma correction, sharpening, noise reduction, white balance, and/or the like. In other implementations, the optional image processing architecture 662 may perform the one or more image processing operations on the uncorrected image data 631 from the one or more image sensors 1014. In some implementations, the optional compositor 664 composites the rendered XR content with the processed image stream of the physical environment from the image processing architecture 662 to produce rendered image frames of the XR environment. In various implementations, the presenter 670 presents the rendered image frames of the XR environment to the user 604 via the one or more displays 1012. One of ordinary skill in the art will appreciate that the optional image processing architecture 662 and the optional compositor 664 may not be applicable for fully virtual environments (or optical see-through scenarios).

Figure 6B:
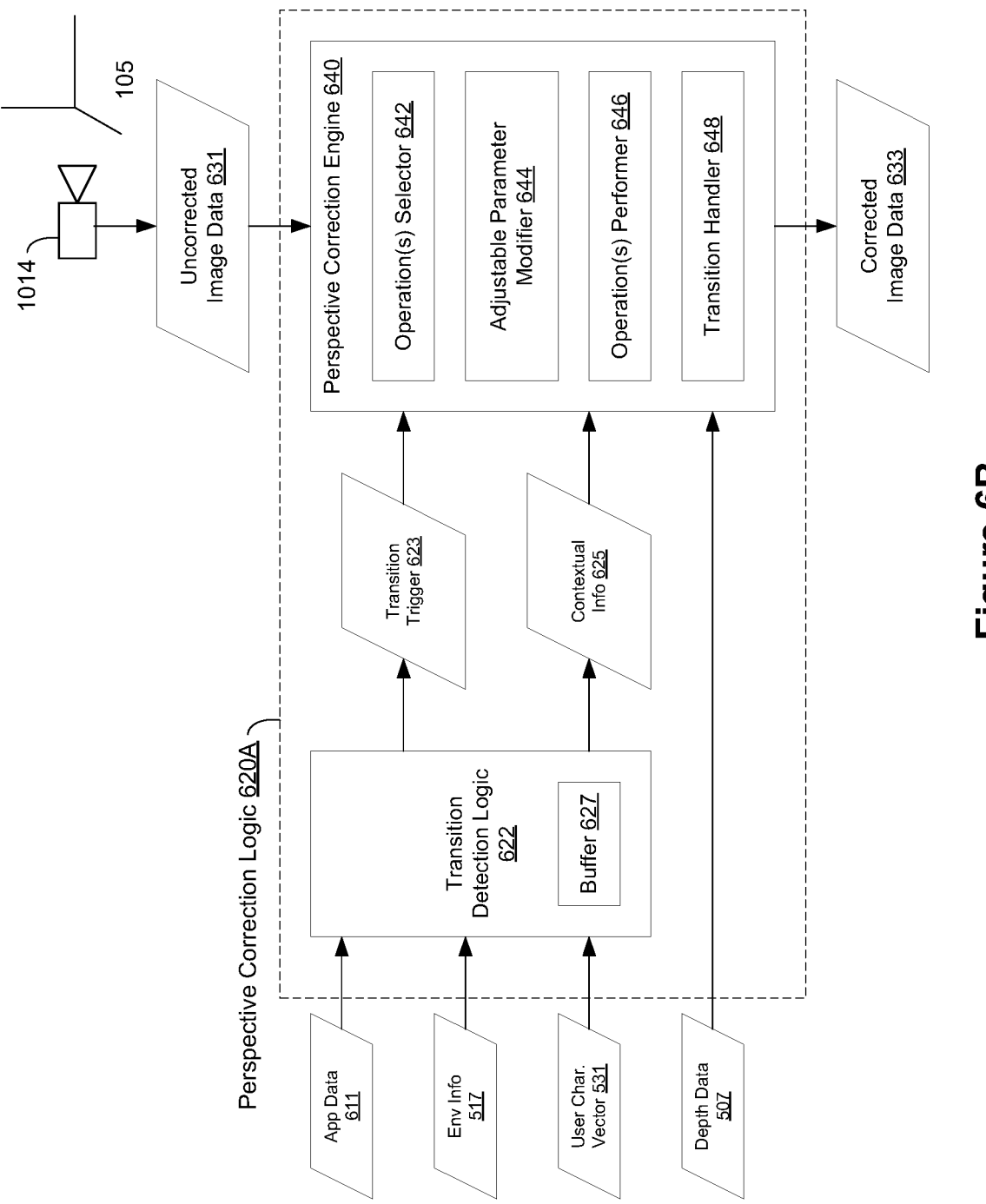
FIG. 6B is a block diagram of perspective correction logic associated with the content delivery architecture in FIG. 6A in accordance with some implementations.

FIG. 6B is a block diagram of perspective correction logic 620A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the perspective correction logic 620A is included in a computing system with one or more processors and non-transitory memory such as the controller 110 shown in FIGS. 1 and 9; the electronic device 120 shown in FIGS. 1 and 10; and/or a suitable combination thereof.

In some implementations, the perspective correction logic 620A includes transition detection logic 622 and a perspective correction engine 640. As shown in FIG. 6B, the transition detection logic 622 obtains (e.g., receives, retrieves, generates, etc.) the environment information 517, the user characterization vector 531, and/or application data 611. According to some implementations, during initialization, the perspective correction engine 640 obtains (e.g., receives, retrieves, generates, etc.) the environment information 517, the user characterization vector 531, and/or the application data 611 and selects an initial (first) set of one or more perspective correction operations based thereon.

According to various implementations, the transition detection logic 622 detects a transition trigger 623 when a change to at least one of the environment information 517, the user characterization vector 531, and/or the application data 611 satisfies a significance threshold. In some implementations, the transition detection logic 622 includes a buffer 627 that stores the environment information 517, the user characterization vector 531, and/or the application data 611 for one or more previous time periods. As such, the transition detection logic 622 is able to compare the environment information 517, the user characterization vector 531, and/or the application data 611 for the current period against the environment information 517, the user characterization vector 531, and/or the application data 611 for one or more previous time periods to determine whether the change to at least one of the environment information 517, the user characterization vector 531, and/or the application data 611 satisfies the significance threshold. For example, the significance threshold filters out minor/insignificant changes in the contextual information. For example, the significance threshold corresponds to a deterministic or non-deterministic value.

In some implementations, the transition detection logic 622 provides contextual information 625 to the perspective correction engine 640 that includes an indication of the change to at least one of the environment information 517, the user characterization vector 531, and/or the application data 611 that satisfies the significance threshold. In some implementations, the transition detection logic 622 provides the transition trigger 623 to the perspective correction engine 640 in order to select a new (second) set of one or more perspective correction operations based on the contextual information 625.

As shown in FIG. 6B, the perspective correction engine 640 includes an operation(s) selector 642, an adjustable parameter modifier 644, an operation(s) performer 646, and a transition handler 648. In some implementations, in response to detecting or obtaining the transition trigger 623, the operation(s) selector 642 selects a new (second) set of perspective correction operations based on the contextual information 625. In some implementations, in response to detecting or obtaining the transition trigger 623, the adjustable parameter modifier 644 modifies the values of one or more adjustable parameters associated with the initial (first) set of perspective correction operations based on the contextual information 625. In some implementations, in response to detecting or obtaining the transition trigger 623, the adjustable parameter modifier 644 sets the values of one or more adjustable parameters associated with the new (second) set of perspective correction operations based on the contextual information 625. The adjustable parameters associated with the perspective correction operations are described in more detail below with reference to FIG. 7A.

In FIG. 6B, the perspective correction engine 640 obtains the uncorrected image data 631 from the one or more image sensors 1014. In some implementations, in response to detecting or obtaining the transition trigger 623, the operation(s) performer 646 generates second corrected image data (e.g., the corrected image data 633) by performing the new (second) set of perspective correction operations on the uncorrected image data 631 based on the depth data 507. In some other implementations, prior to detecting or obtaining the transition trigger 623, the operation(s) performer 646 generates first corrected image data (e.g., the corrected image data 633) by performing the initial (first) set of perspective correction operations on the uncorrected image data 631 based on the depth data 507.

According to various implementations, the transition handler 648 enables a continuous or discrete transition from first corrected image data (e.g., the result of performing the initial (first) set of perspective correction operations on the uncorrected image data 631) to a second corrected image data (e.g., the result of performing the new (second) set of perspective correction operations on the uncorrected image data 631). In some implementations, the transition from the first corrected image data to the second corrected image data may be accompanied with a fade-out animation of the first corrected image data and/or a fade-in animation of the second corrected image data. In some implementations, the computing system presents a blurring effect to obfuscate the transition from the first corrected image data to the second corrected image data.

In various implementations, the transition detection logic 622 samples the depth data 507, environment information 517, the user characterization vector 531, and/or the application data 611 at a first frame rate (e.g., once a second, or the sampling frame rate), whereas the perspective correction engine 640 generates corrected image data 633 at a second frame rate (e.g., 90 times a second, or the display frame rate).

In various implementations, the transition detection logic 622 stores a counter in the buffer 627 and at each sampling period, increases the counter by one, decreases the counter by one, or leaves the counter unchanged. When the counter breaches a threshold, the transition detection logic 622 provides the transition trigger 623 to the perspective correction engine 640. For example, when the counter increases above a first threshold, the transition detection logic 622 provides the transition trigger 623 to the perspective correction engine 640 in order to select a first set of one or more perspective correction operations and when the counter decreases below a second threshold, the transition detection logic 622 provides the transition trigger 623 to the perspective correction engine 640 in order to select a second set of one or more perspective operations.

In various implementations, when the transition detection logic 622 detects, during a sampling period, that a person is near based on a semantic label in the environmental information 517, the counter is left unchanged. Thus, when a person is near, the perspective correction engine 640 does not transition between different sets of one or more perspective operations.

In various implementations, when the transition detection logic 622 detects, during a sampling period, that there is a strong depth gradient based on the depth data 507, the counter is increased and when the transition detection logic 622 detects, during a sampling period, that there is a weak depth gradient based on the depth data 507, the counter is decreased. Thus, the strength of the depth gradient is a primary driver of the transition between different sets of one or more perspective operations. In various implementations, when the transition detection logic 622 detects, during a sampling period, that the strength of the depth gradient is neither strong nor weak, the transition detection logic 622 determines, based on semantic labels in the environmental information 517, whether at least one of a class of objects is present in the environment. In various implementations, the class of objects includes a table, a countertop, a monitor, an electronic device, and similar objects. For example, objects such as monitors and tables are likely to occlude other objects and result in greater depth gradients for which perspective correction may be challenging to perform without artifacts. If the transition detection logic 622 determines that at least one of the class of objects is present in the environment, the counter is increased and if the transition detection logic 622 determines that none of the class of objects is present in the environment, the counter is decreased. Thus, the presence of absence of any of the class of objects is a secondary driver of the transition between different sets of one or more perspective operations.

In various implementations, in response to detecting or obtaining the transition trigger 623, the perspective correction engine 640 transitions between performing a first set of perspective correction operations on the uncorrected image data 631 and performing a second set of perspective correction operations on the uncorrected image data 631. However, the transition is performed over a number of frame periods. Accordingly, between performing the first set of perspective correction operations and performing the second set of perspective correction operations, the perspective correction engine 640 performs a number of intermediate sets of perspective correction operations on the uncorrected image data 631.

In various implementations, the transition between the first set of perspective operations and the second set of perspective operations occurs over a transition time period. During each frame period of the transition time period, the perspective correction engine 640 performs an intermediate set of perspective correction operations that is a percentage between the first set of perspective operations and the second set of perspective operations. The percentage increases by a delta each frame period.

In various implementations, the delta is selected such that the transition is unnoticeable to a user. In various implementations, the delta is a fixed value and, thus, the transition time period is a fixed length. However, in various implementations, the delta is based on the depth data 507, the environmental information 517, the user characterization vector 531, the application data 611 and/or the contextual information 625. In various implementations, these data sources are sampled by the perspective correction engine at a third frame rate, which may be any frame rate between the first frame rate (of the transition detection logic 622) and the second frame rate (of corrected image data 633). In various implementations, these data sources are received by the perspective correction engine 640 as asynchronous events.

In various implementations, the delta is based on head pose information 5106A of the user characterization vector 531. For example, in various implementations, the faster the head pose is changing, the larger the delta. Similarly, the faster a velocity of the head pose is changing, the larger the delta. In various implementations, the delta is based on gaze direction information 5104 of the user characterization vector 531. For example, in various implementations, when a blink or saccade is detected, the delta is large (up to, e.g., 30%). In various implementations, the delta is based on the application data 611. For example, in various implementations, the delta is based on a distractiveness of the application (which may be determined, in part, by the gaze direction information 5104). For example, during a game application with many moving objects, the delta may be larger than during a meditation application. As another example, if the user is reading a large amount of text in a virtual window, the delta may be larger than if the user is manipulating the position of a virtual object.

Figure 6C:
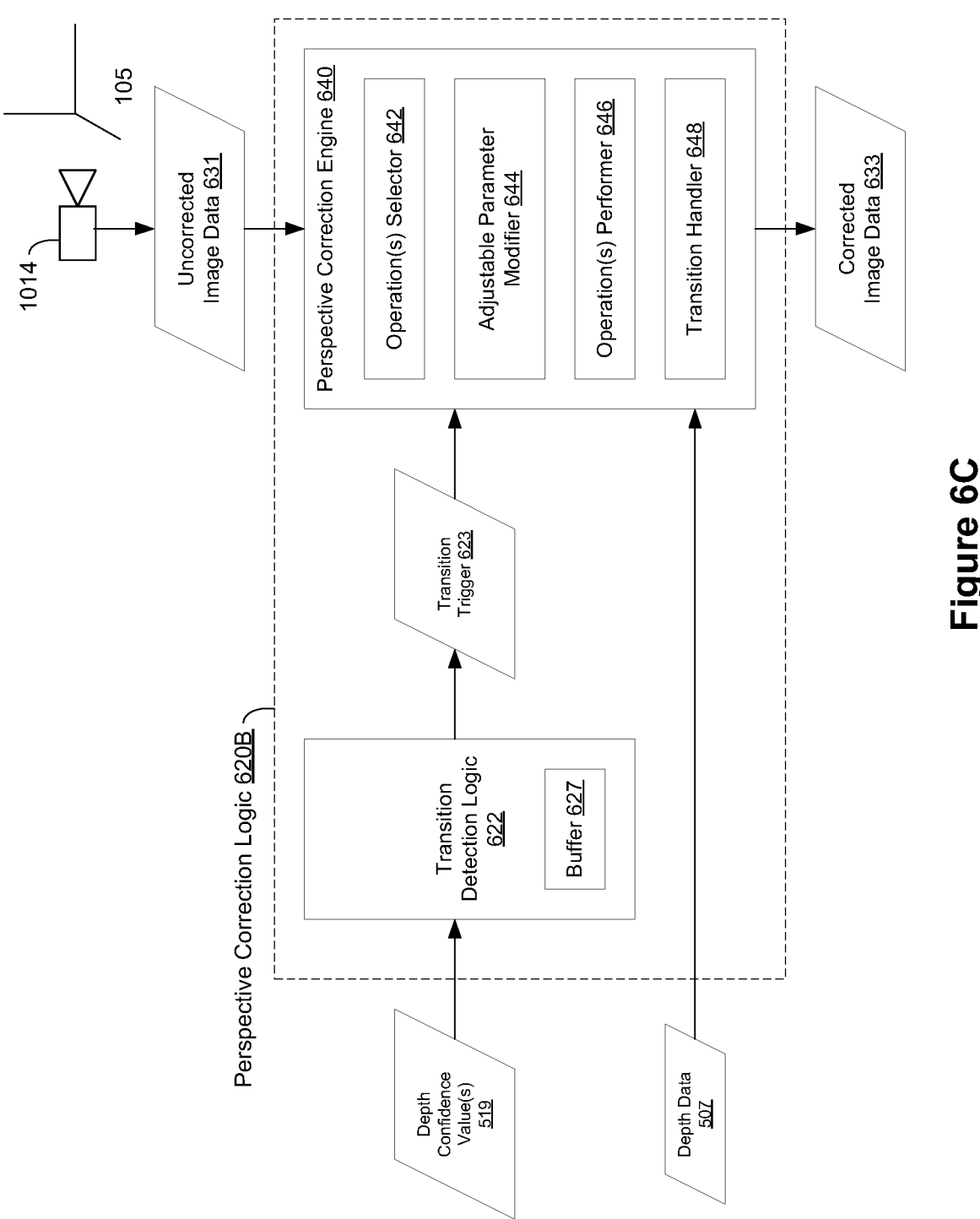
FIG. 6C is another block diagram of perspective correction logic associated with the content delivery architecture in FIG. 6A in accordance with some implementations.

FIG. 6C is a block diagram of perspective correction logic 620B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. FIG. 6C is similar to and adapted from FIG. 6B. As such, similar reference numbers are used between FIGS. 6B and 6C and only the differences will be described herein for the sake of brevity. To that end, as a non-limiting example, the perspective correction logic 620B is included in a computing system with one or more processors and non-transitory memory such as the controller 110 shown in FIGS. 1 and 9; the electronic device 120 shown in FIGS. 1 and 10; and/or a suitable combination thereof.

As shown in FIG. 6C, the transition detection logic 622 obtains (e.g., receives, retrieves, generates, etc.) the depth confidence values 519 for the depth data 507 or separate confidence values for different portions of the depth data 507. For example, if the depth data 507 for the current period changes by more than a predefined tolerance relative to the depth data 507 for a previous time period, the depth data 507 for the current time period may be assigned a low confidence value. As another example, if the depth data 507 includes discontinuities or neighboring values outside of a variance threshold, the depth data 507 may be assigned a low confidence value. As yet another example, if the depth data 507 for a previous time period caused comfort or rendering issues, the depth data 507 for the current time period may be assigned a low confidence value.

According to various implementations, the transition detection logic 622 detects a transition trigger 623 when the one or more depth confidence values 519 fall below a depth confidence threshold. In some implementations, in response to determining that the one or more depth confidence values 519 fall below the depth confidence threshold, the transition detection logic 622 provides the transition trigger 623 to the perspective correction engine 640 in order to select a new (second) set of one or more perspective correction operations. As one example, when the one or more depth confidence values 519 fall below the depth confidence threshold, the operation(s) selector 642 may disable some perspective correction operations that are dependent on the depth data 507 because the depth data 507 is currently inaccurate when selecting the new (second) set of one or more perspective correction operations.

FIG. 7A illustrates various perspective correction operations in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To this end, FIG. 7A shows a table of perspective correction operations 700 (sometimes also referred to herein as the "table 700") and a perspective correction continuum 725 (sometimes also referred to herein as the "continuum 725").

For example, the table 700 illustrates various perspective correction operations and/or adjustable parameters associated therewith. According to some implementations, with reference to FIG. 6B, during initialization, the perspective correction engine 640 selects an initial (first) set of perspective correction operations from the table 700 and sets adjustable parameters associated therewith based on the environment information 517, the user characterization vector 531, and/or the application data 611. According to some implementations, with reference to FIG. 6B, in response to detecting the transition trigger 623, the perspective correction engine 640 selects a new (second) set of perspective correction operations from the table 700 and sets adjustable parameters associated therewith based on the contextual information 625.

As shown in FIG. 7A, the table 700 includes an adjustable depth clamping distance parameter 702 for a depth clamping operation with various selectable values (e.g., between 40 cm from the camera and a simulated infinite distance from the camera). In FIG. 7A, the table 700 also includes an adjustable depth clamping surface type parameter 704 for the depth clamping operation with different selectable surface types such as planar, spherical, or the like. The table 700 also includes an adjustable depth clamping surface orientation parameter 706 for the depth clamping operation with various selectable rotational values for the roll, pitch, and/or yaw of the clamping surface.

Figure 7B:
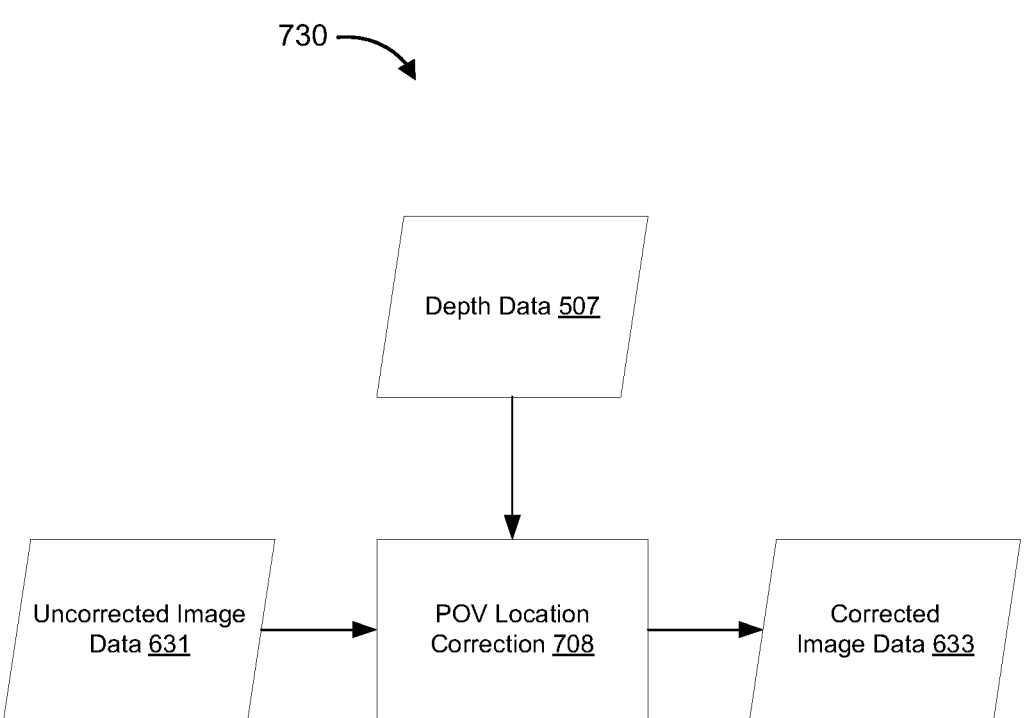
FIG. 7B illustrates a point-of-view (POV) location correction operation in accordance with some implementations.

As shown in FIG. 7A, the table 700 includes a POV location correction operation 708 for selecting X, Y, and/or Z translational offset values for fully or partially accounting for the difference in perspective between the camera and the user. The POV location correction operation 708 is described in more detail below with reference to FIG. 7B.

As shown in FIG. 7A, the table 700 includes a depth smoothing operation 710 with various selectable parameters such as a selection between bilinear filtering or depth smoothing across edges during the depth smoothing operation 710, a smoothing kernel size for the depth smoothing operation 710, and a selection between prioritizing foreground or background stability during the depth smoothing operation 710. In FIG. 7A, the table 700 also includes an adjustable depth resolution parameter 712 with various selectable depth resolutions (e.g., from 0 ppd for pass-through to 3 ppd). In FIG. 7A, the table 700 also includes an adjustable depth frame rate parameter 714 with various selectable depth frame rates (e.g., from 30 fps to 90 fps).

As shown in FIG. 7A, the table 700 further includes a hole filling operation 716 with various selectable hole filing techniques such as no holes, black/shadow effect, and color dilation. In FIG. 7A, the table 700 further includes a temporal warp operation 718 with various selectable temporal warping techniques such as six degrees of freedom (6DOF) temporal warping or three degrees of freedom (3DOF) temporal warping. As one of ordinary skill in the art will appreciate, the table 700 may include miscellaneous other operations or adjustable parameters 720.

In various implementations, images from the scene camera are transformed such that they appear to have been captured at the location of the user's eyes using a depth map representing, for each pixel of the image, the distance from the camera to the object represented by the pixel. However, performing such a transformation takes time. In various implementations, performing the transform includes generating a definition of the transform and applying the transform to the image. Thus, when an image captured at a first time is transformed such that it appears to have been captured at the location of the user's eye at the first time, it is displayed at a second time later than the first time. Further, the user may have moved between the first time and the second time. Accordingly, the transformed image is not what the user would see if the HMD were not present, but what the user would have seen at the first time if the HMD were not present. Accordingly, in various implementations, an image captured at a first time is transformed according to the temporal warp 718 such that it appears to have been captured at a predicted location of the user's eye at the second time at which the transformed image is displayed. In some implementations, the temporal warp 718 accounts for 6DOF or 3DOF between the perspectives of the scene camera and the eyes.

As shown in FIG. 7A, the continuum 725 illustrates various tradeoffs between no perspective correction 726A and full perspective correction 726B. As one example, if none of the perspective correction operations are enabled (e.g., the "no perspective correction" 726A end of the continuum 725), the computing system will produce the least numbers of visual artifacts and also consume the lowest amount of power/resources. However, continuing with this example, if none of the perspective correction operations are enabled (e.g., the "no perspective correction" 726A end of the continuum 725), no comfort enhancements are enabled which may result in poor hand-eye coordination and potential motion sickness in some contexts, but in other user and environment contexts may result in acceptable hand-eye coordination and reduced likelihood of motion sickness.

As another example, if all of the perspective correction operations are enabled (e.g., the "full perspective correction" 726B end of the continuum 725), the computing system will produce the greatest numbers of visual artifacts and also consume the greatest amount of power/resources. However, continuing with this example, if all of the perspective correction operations are enabled (e.g., the "full perspective correction" 726B end of the continuum 725), the most comfort enhancements are enabled which may result in improved hand-eye coordination and reduced potential for motion sickness. Thus, the computing system or a component thereof (e.g., the perspective correction engine 640 in FIGS. 6B and 6C) selects a set of perspective correction operations based on the current user state, the current state of the physical environment, and/or the current foreground application in order to balance visual artifact generation and power/resource consumption against comfort and potential motion sickness.

As one example, while the computing system is presenting an immersive video experience 727, comfort and/or potential motion sickness may not be a significant factor because the current user state indicates a sitting posture, and, thus, the computing system may perform less perspective correction operations. In contrast, as another example, while the computing system is presenting an XR gaming experience 729, comfort and/or potential motion sickness may be a significant factor because the current user state indicates a standing/moving posture, and, thus, the computing system may perform more perspective correction operations.

FIG. 7B illustrates a method 730 for performing the POV location correction operation 708 according to some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the method 730 is performed by a computing system or a component thereof (e.g., the perspective correction engine 640 in FIG. 6B) with one or more processors and non-transitory memory such as the controller 110 shown in FIGS. 1 and 9; the electronic device 120 shown in FIGS. 1 and 10; and/or a suitable combination thereof. In some implementations, the method 730 is performed by processing logic, including hardware, firmware, software, or a combination thereof. In some implementations, the method 730 is performed by a processor executing instructions (e.g., code) stored in a non-transitory computer-readable medium (e.g., a memory)

As shown in FIG. 7B, the method 730 includes obtaining (e.g., receiving, retrieving, capturing, etc.) uncorrected image data 631. As shown in FIG. 7B, the method 730 also includes obtaining (e.g., receiving, retrieving, capturing, etc.) depth data 507 associated with the physical environment 105 via one or more depth sensors (e.g., the one or more depth sensors 506 of the electronic device 120 in FIG. 10). In various implementations, the depth information includes a depth map for the physical environment. In various implementations, the depth map is based on an initial depth map in which the value of each pixel represents the depth to the object represented by the pixel. For example, the depth map may be an altered version of the initial depth map.

Thus, in various implementations, obtaining the depth information of the physical environment includes determining the depth value for the camera set of two-dimensional coordinates (e.g., the image space/plane) via interpolation using depth values of locations surrounding the camera set of two-dimensional coordinates. In various implementations, the depth value is determined using a three-dimensional model of the physical environment. For example, the depth value can be determined using ray tracing from the camera location through the image plane at the pixel location to a static object in the three-dimensional model. Thus, in various implementations, obtaining the depth information of the physical environment includes determining a depth value for the camera set of two-dimensional coordinates based on a three-dimensional model of the physical environment.

In various implementations, the depth information of the physical environment is a smoothed depth map resulting from spatially filtering an initial depth map. In various implementations, the depth information of the physical environment is a clamped depth map in which each pixel of an initial depth map having a value below a depth threshold is replaced with the depth threshold.

The method 730 further includes performing the POV location correction operation 708 on the uncorrected image data 631 by transforming the uncorrected image data 631 into corrected image data 633 based on the depth data 507. According to some implementations, the POV location correction operation 708 includes transforming the camera set of two-dimensional coordinates (e.g., the image space/plane) into a display set of two-dimensional coordinates (e.g., the display space/plane) based on the depth information. In various implementations, the transformation is based on a difference between the perspective of the image sensor that captured the image of the physical environment and the perspective of the user.

In various implementations, the display set of two-dimensional coordinates is determined according to the following relation in which $x_c$ and $y_c$ are the camera set of two-dimensional coordinates, $x_d$ and $y_d$ are the display set of two-dimensional coordinates, $P_c$ is a 4×4 view projection matrix of the image sensor representing the perspective of the image sensor, $P_d$ is a 4×4 view projection matrix of the user representing the perspective of the user, and d is the depth map value at the camera set of two-dimensional coordinates:

$$\begin{bmatrix} x_d \\ y_d \end{bmatrix} \leftarrow P_d \cdot P_c^{-1} \cdot \begin{bmatrix} x_c \\ y_c \\ d \\ 1 \end{bmatrix}.$$

In various implementations, the method 730 further comprises determining an input set of three-dimensional coordinates in the physical environment by triangulating the display set of two-dimensional coordinates and a second display set of two-dimensional coordinates. In various implementations, the second display set of two-dimensional coordinates are obtained in a similar manner to the display set of two-dimensional coordinates for a second camera plane or second image sensor, e.g., for a second eye of the user wherein the display set of two-dimensional coordinates are determined for a first eye of the user. For example, in various implementations, the device projects the physical set of three-dimensional coordinates to a second image plane to obtain a second camera set of two-dimensional coordinates and transforms them, using depth information, to generate the second display set of two-dimensional coordinates.

FIG. 7C illustrates various perspective correction scenarios in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To this end, FIG. 7C shows a table 750 with scenarios 751A, 751B, and 751C.

As shown in FIG. 7C, the scenario 751A corresponds to situation in which a user is watching a movie. With respect to the scenario 751A, power consumption is a priority, and potential motion sickness is not a priority because the user is not in motion. For example, with reference to the scenario 751A, the computing system or a component thereof (e.g., the perspective correction engine 640 in FIG. 6B) selects the following perspective correction operations and/or sets the following values for various adjustable parameters: full POV location correction operation (e.g., X, Y, and Z translational offsets to align the camera and user perspectives), 3DOF temporal warping operation on passthrough image data, simulate the depth clamping distance at infinity, and set the depth resolution at 0 ppd. As a result, the potential for motion sickness will be high, the power usage will be low, the image quality will be high, and hand-eye coordination will be low.

As shown in FIG. 7C, the scenario 751B corresponds to situation in which a user is located in a crowded meeting place (e.g., a train station, airport, stadium, etc.) where depth estimation may be unstable and the background frequency may be high. With respect to the scenario 751B, the reduction of visual artifacts is a priority. For example, with reference to the scenario 751B, the computing system or a component thereof (e.g., the perspective correction engine 640 in FIG. 6B) selects the following perspective correction operations and/or set the following values for various adjustable parameters: partial POV location correction operation (e.g., account for the X translational offset between the camera and user perspectives), 6DOF temporal warping operation, clamped plane at 70 cm from the camera, and set the depth resolution at 1.5 ppd. As a result, the potential for motion sickness will be medium, the power usage will be high, the image quality will be high, and hand-eye coordination will be medium.

As shown in FIG. 7C, the scenario 751C corresponds to situation in which a user is working at a desk or browsing around a store/museum where the user is at least partially in motion. With respect to the scenario 751C, potential motion sickness is a priority. For example, with reference to the scenario 751C, the computing system or a component thereof (e.g., the perspective correction engine 640 in FIG. 6B) selects the following perspective correction operations and/or set the following values for various adjustable parameters: partial POV location correction operation (e.g., account for the X and Z translational offsets between the camera and user perspectives), 6DOF temporal warping operation, clamped plane at 70 cm from the camera, and set the depth resolution at 1.5 ppd. As a result, the potential for motion sickness will be low, the power usage will be high, the image quality will be medium, and hand-eye coordination will be high.

FIGS. 8A and 8B illustrate is a flowchart representation of a method 800 of context-based selection of perspective correction operations in accordance with some implementations. In various implementations, the method 800 is performed at a computing system including non-transitory memory and one or more processors, wherein the computing system is communicatively coupled to a display device and one or more image sensors via a communication interface (e.g., the controller 110 in FIGS. 1 and 9, the electronic device 120 in FIGS. 1 and 10, or a combination thereof). In some implementations, the method 800 is performed by processing logic, including hardware, firmware, software, or a combination thereof. In some implementations, the method 800 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As represented by block 802, the method 800 includes obtaining (e.g., receiving, retrieving, capturing, etc.), via the one or more image sensors, image data associated with a physical environment. For example, the one or more image sensors correspond to scene/exterior-facing cameras. As one example, with reference to FIGS. 6B and 6C, the computing system or a component thereof (e.g., the perspective correction engine 640) obtains the uncorrected image data 631 from the one or more image sensors 1014.

As represented by block 804, the method 800 includes obtaining (e.g., receiving, retrieving, capturing, generating, etc.) first contextual information including at least one of first user information associated with a current state of a user of the computing system, first application information associated with a first application being executed by the computing system, and first environment information associated with a current state of the physical environment. In some implementations, the first contextual information is associated with a first time or time period. As such, in various implementations, the computing system may continually or periodically monitor and update the contextual information over time when a change occurs thereto. As one example, with reference to FIG. 6B, the computing system or a component thereof (e.g., the transition detection logic 622) obtains (e.g., receives, retrieves, generates, etc.) the environment information 517, the user characterization vector 531, and/or the application data 611.

In some implementations, the first user information includes at least one of head pose information, body pose information, eye tracking information, and user motion information characterizing the current state of the user of the computing system. For example, the first user information corresponds to the user characterization vector 531 described in further detail with reference to FIGS. 5A, 5B, and 6A.

In some implementations, the first application information at least includes an identifier associated with the first application and state information associated with the first application. For example, the first application information corresponds to the application data 611 described in further detail with reference to FIGS. 6A and 6B.

In some implementations, the first environment information includes at least one of a label for the physical environment, a background frequency value, labels for one or more objects within the physical environment, ambient audio information, and an ambient light level characterizing the current state of physical environment. For example, the first environment information corresponds to the environment information 517 described in further detail with reference to FIGS. 5A and 6A.

As represented by block 806, the method 800 includes selecting a first set of perspective correction operations based at least in part on the first contextual information. In some implementations, the computing system also determines parameter values for each of the first set of perspective correction operations. In some implementations, the computing system determines the first set of perspective correction operations by balancing the impact of the first set of perspective correction operations on various user experience metrics, such as potential motion sickness, power usage, image quality, and hand-eye coordination, in light of the first contextual information. As one example, the continuum 725 in FIG. 7A illustrates various tradeoffs between "no perspective correction" 726A and "full perspective correction" 726B. As another example, the table 750 in FIG. 7C illustrates various perspective correction operations that are active for different scenarios 751A, 751B, and 751C.

As one example, with reference to FIG. 6B, the computing system or a component thereof (e.g., the perspective correction engine 640) obtains (e.g., receives, retrieves, generates, etc.) the environment information 517, the user characterization vector 531, and/or the application data 611 and selects an initial (first) set of one or more perspective correction operations based thereon during initialization. In some implementations, selecting the first set of perspective correction operations includes determining values for adjustable parameters associated with each of the first set of perspective correction operations based at least in part on the first contextual information. For example, the table 700 in FIG. 7A illustrates various perspective correction operations and/or adjustable parameters associated therewith. In some implementations, the first set of perspective correction operations includes at least one of depth clamping, point-of-view (POV) location correction, depth smoothing, hole filling, and temporal warping.

As one example, the adjustable parameters for the depth clamping operation include a clamping distance, a clamping surface type, a clamping surface orientation, and/or the like. As another example, the adjustable parameters for POV location correction operation include full or partial X, Y, and/or Z translational offsets to account for differences between the user and camera perspectives. As yet another example, the adjustable parameters for a temporal warping operation includes 6DOF temporal warping or 3DOF temporal warping.

As represented by block 808, the method 800 includes generating first corrected image data by performing the first set of perspective correction operations on the image data. In some implementations, the computing system generates the first corrected image stream by performing a first set of perspective correction operations on the uncorrected image stream based on current depth information. As one example, with reference to FIG. 6B, the computing system or a component thereof (e.g., the operation(s) performer 646) generates first corrected image data (e.g., the corrected image data 633) by performing the initial (first) set of perspective correction operations on the uncorrected image data 631 based on the depth data 507. For example, the depth information includes depth values for each pixel in the uncorrected image stream, a depth map for the physical environment, and/or the like.

As represented by block 810, the method 800 includes causing, via the display device, presentation of the first corrected image data. As one example, with reference to FIG. 6A, the computing system or a component thereof (e.g., the presenter 670) presents the corrected image data 633 (or a derivative thereof composited with the rendered XR content) via the one or more displays 1012.

According to some implementations, as represented by block 812, the method 800 includes detecting a change from the first contextual information to second contextual information including at least one of second user information associated with the current state of a user of the computing system, second application information associated with a second application different from the first application being executed by the computing system, and second environment information associated with the current state of the physical environment. In some implementations, the computing system generates a transition trigger in response to detecting the change in contextual information that satisfies a significance threshold.

As one example, with reference to FIG. 6B, the computing system or a component thereof (e.g., the transition detection logic 622) detects a transition trigger 623 when a change to at least one of the environment information 517, the user characterization vector 531, and/or the application data 611 satisfies a significance threshold. In some implementations, the transition detection logic 622 includes a buffer 627 that stores the environment information 517, the user characterization vector 531, and/or the application data 611 for one or more previous time periods. As such, the transition detection logic 622 is able to compare the environment information 517, the user characterization vector 531, and/or the application data 611 for a current period against the environment information 517, the user characterization vector 531, and/or the application data 611 for one or more previous time periods to determine whether the change to at least one of the environment information 517, the user characterization vector 531, and/or the application data 611 satisfies a significance threshold. For example, the significance threshold filters out minor/insignificant changes in the contextual information. For example, the significance threshold corresponds to a deterministic or non-deterministic value.

In some implementations, the first and second sets of perspective correction operations include mutually exclusive perspective correction operations. In some implementations, the first and second sets of perspective correction operations include at least one overlapping perspective correction operation. In some implementations, the least one overlapping perspective correction operation includes an adjustable parameter with a first value in the first set of perspective correction operations, and wherein the least one overlapping perspective correction operation includes the adjustable parameter with a second value different from the first value in the second set of perspective correction operations In some implementations, the first and second values are deterministic (e.g., one of a plurality of predetermined values) or non-deterministic values (e.g., dynamically calculated based on the current contextual information).

In some implementations, the change from the first contextual information to the second contextual information corresponds to a transition from the first application being executed by the computing system to a second application different from the first application being executed by the computing system. For example, the transition from the first application to the second application corresponds to a transition from an immersive video playback application to an interactive gaming application, or vice versa.

In some implementations, the change from the first contextual information to the second contextual information corresponds to a change in the current state of the user associated with a transition from a first user motion state to a second user motion state different from the first user motion state. For example, the transition from the first user motion state to the second user motion state corresponds to a transition from sitting to walking, or vice versa.

In some implementations, the change from the first contextual information to the second contextual information corresponds to a change in the current state of the physical environment associated with a transition from a first ambient light level detected within the physical environment to a second ambient light level different from the first ambient light level detected within the physical environment. For example, the transition from the first ambient light level to the second ambient light level corresponds to a transition from indoors to outdoors, or vice versa.

In some implementations, the change from the first contextual information to the second contextual information corresponds to a change in the current state of the physical environment associated with a transition from a first background associated with a first frequency value within the physical environment to a second background associated with a second frequency value different from the first frequency value within the physical environment. For example, the transition from the first background associated with the first frequency value to the second background associated with the second frequency value corresponds to a transition from a first background associated with a blank wall to a second background associated with a cluttered set of shelves, or vice versa.

According to some implementations, as represented by block 814, in response to detecting the change from the first contextual information to the second contextual information, the method 800 includes: selecting a second set of perspective correction operations different from the first set of perspective correction operations on the image data; generating second corrected image data by performing the second set of perspective correction operations on the uncorrected image stream; and causing, via the display device, presentation of the second corrected image data. In some implementations, the computing system determines the second set of perspective correction operations by balancing the impact of the second set of perspective correction operations on various user experience metrics such as potential motion sickness, power usage, image quality, and hand-eye coordination.

As one example, with reference to FIG. 6B, in response to detecting or obtaining the transition trigger 623, the computing system or a component thereof (e.g., the operation(s) selector 642) selects a new (second) set of perspective correction operations based on the contextual information 625. According to some implementations, the contextual information 625 includes an indication of the change to at least one of the environment information 517, the user characterization vector 531, and/or the application data 611 that satisfies the significance threshold. Continuing with this example, with reference to FIG. 6B, in response to detecting or obtaining the transition trigger 623, the computing system or a component thereof (e.g., the operation(s) performer 646) generates second corrected image data (e.g., the corrected image data 633) by performing the new (second) set of perspective correction operations on the uncorrected image data 631 based on the depth data 507. Continuing with example, with reference to FIG. 6A, the computing system or a component thereof (e.g., the presenter 670) presents the second corrected image data 633 (or a derivative thereof composited with the rendered XR content) via the one or more displays 1012.

In some implementations, the method 800 includes causing, via the display device, presentation of an animation associated with the first corrected image data prior to presenting the second corrected image data. In some implementations, the transition from the first corrected image data to the second corrected image data may be accompanied with a fade-out animation of the first corrected image data and/or a fade-in animation of the second corrected image data. In some implementations, the computing system presents a blurring effect to obfuscate the transition from the first corrected image data to the second corrected image data. In some implementations, the method 800 includes ceasing presentation of the first corrected image data prior to presenting the second corrected image data. As one example, with reference to FIG. 6B, in response to detecting or obtaining the transition trigger 623, the computing system or a component thereof (e.g., the transition handler 648) enables a continuous or discrete transition from first corrected image data (e.g., the result of performing the initial (first) set of perspective correction operations on the uncorrected image data 631) to a second corrected image data (e.g., the result of performing the new (second) set of perspective correction operations on the uncorrected image data 631).

In various implementations, detecting the change from the first contextual information to the second contextual information includes storing a counter and increasing or decreasing the counter based on at least one of the second user information, the second application information, and the second environment information. In various implementation, the computing system detects the change from the first contextual information to the second contextual information in response to the counter breaching a threshold.

In various implementations, increasing or decreasing the counter includes increasing the counter based on a determination that the second environment information indicates a strong depth gradient of the current environment and decreasing the counter based on a determination that the second environment information indicates a weak depth gradient of the current environment. In various implementations, increasing or decreasing the counter includes increasing the counter based on a determination that the second environment information indicates a moderate depth gradient of the current environment and the current environment includes at least one of a class of objects and decreasing the counter based on a determination that the second environment information indicates a moderate depth gradient of the current environment and the current environment includes none of the class of objects.

In various implementations, presentation of the second corrected image data occurs a transition time period after presentation of the first corrected image data, and the method 800 further comprising, at an intermediate time within the transition time period selecting an intermediate set of perspective correction operations a percentage between the first set of perspective correction operations and the second set of perspective correction operations. The method 800 further includes generating intermediate corrected image data by performing an intermediate set of perspective correction operations on the uncorrected image stream and causing, via the display device, presentation of the intermediate corrected image data.

In various implementations, the percentage is based on the second user information indicating a change in head pose of the user. In various implementations, the percentage is based on the second application information indicating a distractiveness of the second application.

According to some implementations, the computing system is further communicatively coupled to one or more depth sensors via the communication interface, and the method 800 also includes: obtaining, via the one or more depth sensors, depth information associated with the physical environment, wherein the first corrected image data is generated by performing the first set of perspective correction operations on the image data based on depth information. In some implementations, the method 800 further includes: determining one or more confidence values for the depth information, wherein the first set of perspective correction operations are determined based at least in part on the first contextual information or the one or more confidence values for the depth information. For example, the one or more confidence values for the depth information includes pixel-wise confidence values, an image-wise confidence value, and/or the like.

As one example, with reference to FIG. 6C, the computing system or a component thereof (e.g., the transition detection logic 622) detects a transition trigger 623 when the one or more depth confidence values 519 fall below a depth confidence threshold. Continuing with this example, with reference to FIG. 6C, when the one or more depth confidence values 519 fall below the depth confidence threshold, the computing system or a component thereof (e.g., the operation(s) selector 642) may disable some perspective correction operations that are dependent on the depth data 507 because the depth data 507 is currently inaccurate when selecting the new (second) set of one or more perspective correction operations.

Figure 9:
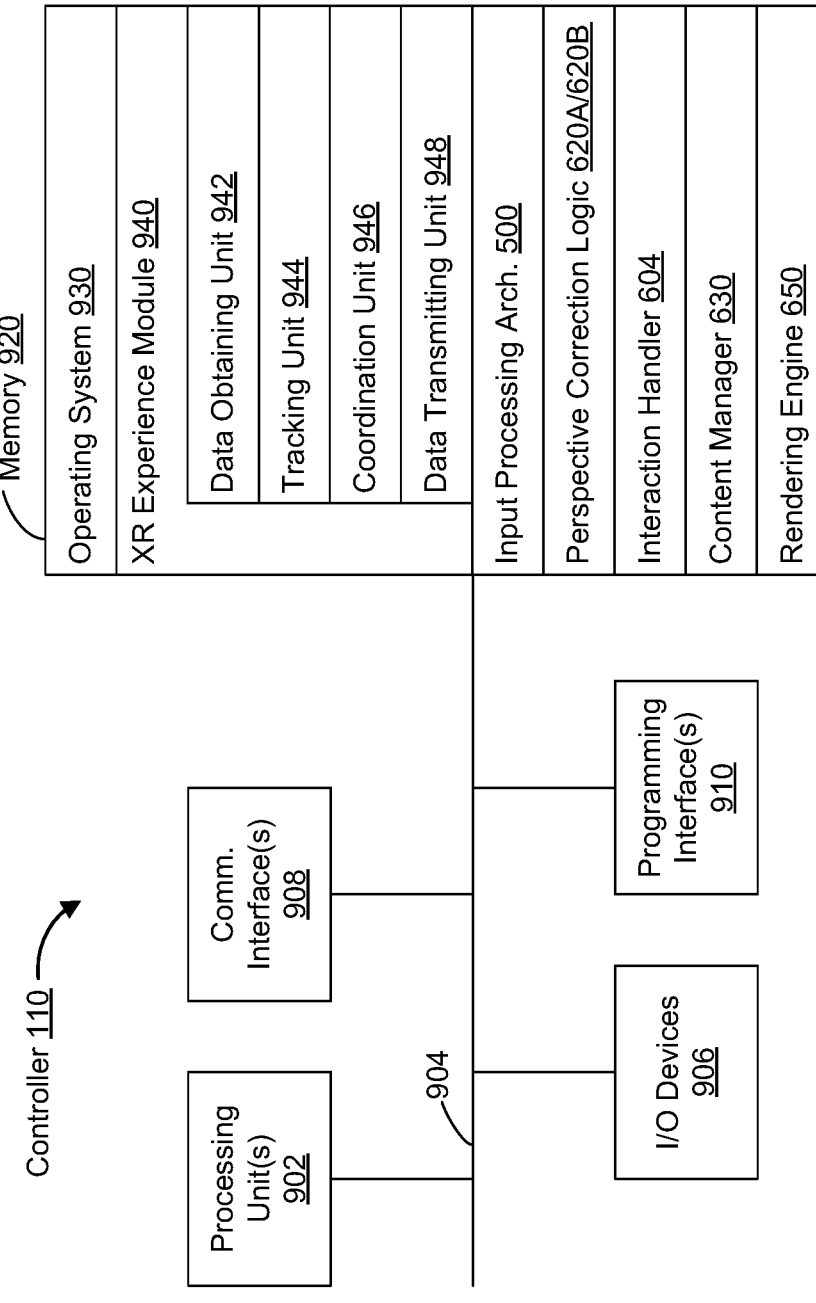
FIG. 9 is a block diagram of an example controller in accordance with some implementations.

FIG. 9 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 902 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 906, one or more communication interfaces 908 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 910, a memory 920, and one or more communication buses 904 for interconnecting these and various other components.

In some implementations, the one or more communication buses 904 include circuitry that interconnects and controls communications between system components. In some implementations, the one or more I/O devices 906 include at least one of a keyboard, a mouse, a touchpad, a joystick, one or more microphones, one or more speakers, one or more image sensors, one or more displays, and/or the like.

The memory 920 includes high-speed random-access memory, such as dynamic random-access memory (DRAM), static random-access memory (SRAM), double-data-rate random-access memory (DDR RAM), or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules and data structures, or a subset thereof including an optional operating system 930, an XR experience module 940, an input processing architecture 500, perspective correction logic 620A/620B, an interaction handler 604, a content manager 630, and a rendering engine 650.

The operating system 930 includes procedures for handling various basic system services and for performing hardware dependent tasks. In some implementations, the XR experience module 940 is configured to manage and coordinate one or more XR experiences for one or more users (e.g., a single XR experience for one or more users, or multiple XR experiences for respective groups of one or more users). To that end, in various implementations, the XR experience module 940 includes a data obtaining unit 942, a tracking unit 944, a coordination unit 946, and a data transmitting unit 948.

In some implementations, the data obtaining unit 942 is configured to obtain data (e.g., presentation data, interaction data, sensor data, location data, etc.) from at least the electronic device 120 of FIG. 1. To that end, in various implementations, the data obtaining unit 942 includes instructions and/or logic therefor, and heuristics and metadata therefor.

In some implementations, the tracking unit 944 is configured to map the physical environment 105 and to track the position/location of at least the electronic device 120 with respect to the physical environment 105 of FIG. 1. To that end, in various implementations, the tracking unit 944 includes instructions and/or logic therefor, and heuristics and metadata therefor.

In some implementations, the coordination unit 946 is configured to manage and coordinate the XR experience presented to the user by the electronic device 120. To that end, in various implementations, the coordination unit 946 includes instructions and/or logic therefor, and heuristics and metadata therefor.

In some implementations, the data transmitting unit 948 is configured to transmit data (e.g., presentation data, location data, etc.) to at least the electronic device 120. To that end, in various implementations, the data transmitting unit 948 includes instructions and/or logic therefor, and heuristics and metadata therefor.

In some implementations, the input processing architecture 500 is configured to process input data as shown above with reference to FIG. 5A. To that end, in various implementations, the input processing architecture 500 is includes instructions and/or logic therefor, and heuristics and metadata therefor.

In some implementations, the perspective correction logic 620A/620B is configured generate corrected image data 633 by performing one or more perspective correction operations on the uncorrected image data 631 as shown above with reference to FIGS. 6A-6C. To that end, in various implementations, the perspective correction logic 620A/620B is includes instructions and/or logic therefor, and heuristics and metadata therefor.

In some implementations, the interaction handler 604 is configured to obtain one or more user inputs 601 such as eye tracking or gaze-based inputs, hand tracking inputs, touch inputs, voice inputs, and/or the like as shown above with reference to FIG. 6A. To that end, in various implementations, the interaction handler 604 is includes instructions and/or logic therefor, and heuristics and metadata therefor.

In some implementations, the content manager 630 is configured to manage and update the layout, setup, structure, and/or the like for the UI or the XR environment, including one or more of VAs, XR content, one or more UI elements associated with the XR content, and/or the like, based on the one or more user inputs 601 as shown above with reference to FIG. 6A. To that end, in various implementations, the interaction handler 604 is includes instructions and/or logic therefor, and heuristics and metadata therefor.

In some implementations, the rendering engine 650 is configured to render a UI or XR content as shown above with reference to FIG. 6A. As shown in FIG. 6A, the rendering engine 650 includes a pose determiner 652, a renderer 654, an optional image processing architecture 662, and an optional compositor 664. To that end, in various implementations, the rendering engine 650 is includes instructions and/or logic therefor, and heuristics and metadata therefor.

Although the data obtaining unit 942, the tracking unit 944, the coordination unit 946, the data transmitting unit 948, the input processing architecture 500, the perspective correction logic 620A/620B, the interaction handler 604, the content manager 630, and the rendering engine 650 are shown as residing on a single device (e.g., the controller 110), it should be understood that in other implementations, any combination of the data obtaining unit 942, the tracking unit 944, the coordination unit 946, the data transmitting unit 948, the input processing architecture 500, the perspective correction logic 620A/620B, the interaction handler 604, the content manager 630, and the rendering engine 650 may be located in separate computing devices.

Moreover, FIG. 9 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 10:
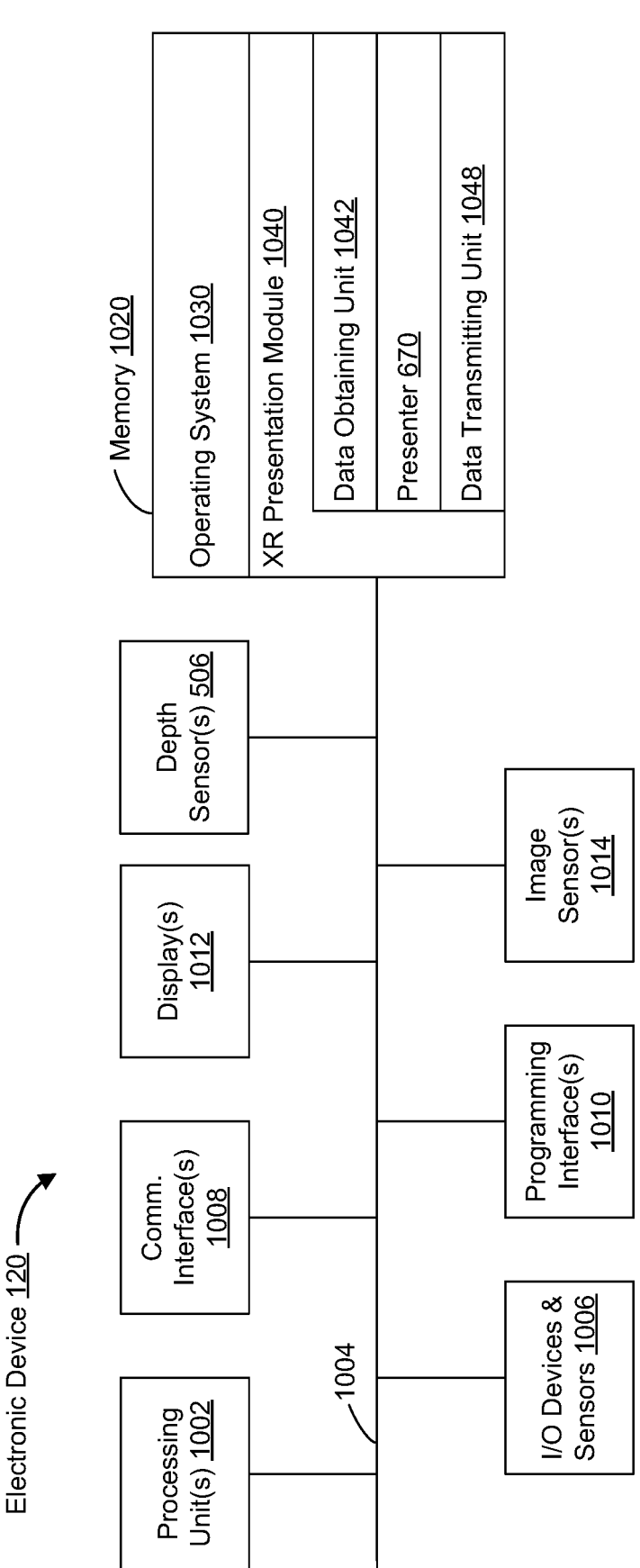
FIG. 10 is a block diagram of an example electronic device in accordance with some implementations.

FIG. 10 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1010, one or more displays 1012, one or more optional interior- and/or exterior-facing image sensors 1014, one or more optional depth sensors 1016, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, and/or the like.

In some implementations, the one or more displays 1012 are configured to provide the user interface or the XR experience to the user. In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 1012 correspond to diffractive, reflective, polarized, holographic, etc. waveguide displays. For example, the electronic device 120 includes a single display. In another example, the electronic device includes a display for each eye of the user. In some implementations, the one or more displays 1012 are capable of presenting MR and VR content.

In some implementations, the one or more image sensors 1014 are configured to obtain image data that corresponds to at least a portion of the face of the user that includes the eyes of the user (any may be referred to as an eye-tracking camera). In some implementations, the one or more image sensors 1014 are configured to be forward-facing so as to obtain image data that corresponds to the physical environment as would be viewed by the user if the electronic device 120 was not present (and may be referred to as a scene camera). The one or more optional image sensors 1014 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like. In some implementations, the one or more depth sensors 506 correspond to a structured light device, a time-of-flight device, and/or the like.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules and data structures, or a subset thereof including an optional operating system 1030 and an XR presentation module 1040.

The operating system 1030 includes procedures for handling various basic system services and for performing hardware dependent tasks. In some implementations, the XR presentation module 1040 is configured to present XR content to the user via the one or more displays 1012. To that end, in various implementations, the XR presentation module 1040 includes a data obtaining unit 1042, a presenter 670, and a data transmitting unit 1048.

In some implementations, the data obtaining unit 1042 is configured to obtain data (e.g., presentation data, interaction data, sensor data, location data, etc.) from at least the controller 110 of FIG. 1. To that end, in various implementations, the data obtaining unit 1042 includes instructions and/or logic therefor, and heuristics and metadata therefor.

In some implementations, the presenter 670 is configured to display the transformed image via the one or more displays 1012. To that end, in various implementations, the presenter 670 includes instructions and/or logic therefor, and heuristics and metadata therefor.

In some implementations, the data transmitting unit 1048 is configured to transmit data (e.g., presentation data, location data, etc.) to at least the controller 110. In some implementations, the data transmitting unit 1048 is configured to transmit authentication credentials to the electronic device. To that end, in various implementations, the data transmitting unit 1048 includes instructions and/or logic therefor, and heuristics and metadata therefor.

Although the data obtaining unit 1042, the presenter 670, and the data transmitting unit 1048 are shown as residing on a single device (e.g., the electronic device 120), it should be understood that in other implementations, any combination of the data obtaining unit 1042, the presenter 670, and the data transmitting unit 1048 may be located in separate computing devices.

Moreover, FIG. 10 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a computing system including non-transitory memory and one or more processors, wherein the computing system is communicatively coupled to a display device and one or more image sensors via a communication interface;

obtaining, via the one or more image sensors, image data associated with a physical environment;

obtaining first contextual information including at least one of first user information associated with a current state of a user of the computing system, first application information associated with a first application being executed by the computing system, and first environment information associated with a current state of the physical environment;

selecting a first set of perspective correction operations based at least in part on the first contextual information;

generating first corrected image data by performing the first set of perspective correction operations on the image data;

causing, via the display device, presentation of the first corrected image data;

detecting a change from the first contextual information to second contextual information including at least one of second user information associated with the current state of a user of the computing system, second application information associated with a second application different from the first application being executed by the computing system, and second environment information associated with the current state of the physical environment; and in response to detecting the change from the first contextual information to the second contextual information:

selecting a second set of perspective correction operations different from the first set of perspective correction operations;

generating second corrected image data by performing the second set of perspective correction operations on the image data; and causing, via the display device, presentation of the second corrected image data.

2. The method of claim 1, wherein the first set of perspective correction operations includes at least one of depth clamping, point-of-view (POV) location correction, depth smoothing, hole filling, and temporal warping.

3. The method of claim 1, wherein the first user information includes at least one of head pose information, body pose information, eye tracking information, and user motion information characterizing the current state of the user of the computing system.

4. The method of claim 1, wherein the first application information at least includes an identifier associated with the first application and state information associated with the first application.

5. The method of claim 1, wherein the first environment information includes at least one of a label for the physical environment, a background frequency value, labels for one or more objects within the physical environment, ambient audio information, and an ambient light level characterizing the current state of physical environment.

6. The method of claim 1, wherein selecting the first set of perspective correction operations includes determining values for adjustable parameters associated with each of the first set of perspective correction operations based at least in part on the first contextual information.

7. The method of claim 1, wherein detecting the change from the first contextual information to the second contextual information includes:

storing a counter;

increasing or decreasing the counter based on at least one of the second user information, the second application information, and the second environment information; and detecting the change from the first contextual information to the second contextual information in response to the counter breaching a threshold.

8. The method of claim 7, wherein increasing or decreasing the counter includes:

increasing the counter based on a determination that the second environment information indicates a strong depth gradient of the current environment; and decreasing the counter based on a determination that the second environment information indicates a weak depth gradient of the current environment.

9. The method of claim 8, wherein increasing or decreasing the counter includes:

increasing the counter based on a determination that the second environment information indicates a moderate depth gradient of the current environment and the current environment includes at least one of a class of objects; and decreasing the counter based on a determination that the second environment information indicates the moderate depth gradient of the current environment and the current environment includes none of the class of objects.

10. The method of claim 1, wherein presentation of the second corrected image data occurs a transition time period after presentation of the first corrected image data, further comprising, at an intermediate time within the transition time period:

selecting an intermediate set of perspective correction operations a percentage between the first set of perspective correction operations and the second set of perspective correction operations;

generating intermediate corrected image data by performing the intermediate set of perspective correction operations on the image data; and causing, via the display device, presentation of the intermediate corrected image data.

11. The method of claim 10, wherein the percentage is based on the second user information indicating a change in head pose of the user.

12. The method of claim 10, wherein the percentage is based on the second application information indicating a distractiveness of the second application.

13. The method of claim 1, wherein the computing system is also communicatively coupled to one or more depth sensors via the communication interface, and the method further comprising:

obtaining, via the one or more depth sensors, depth information associated with the physical environment, wherein the first corrected image data is generated by performing the first set of perspective correction operations on the image data based on depth information.

14. A computing system comprising:

an interface for communicating with a display device and one or more image sensors;

a non-transitory memory; and one or more processors to:

obtain, via the one or more image sensors, image data associated with a physical environment;

obtain first contextual information including at least one of first user information associated with a current state of a user of the computing system, first application information associated with a first application being executed by the computing system, and first environment information associated with a current state of the physical environment;

select a first set of perspective correction operations based at least in part on the first contextual information;

generate first corrected image data by performing the first set of perspective correction operations on the image data;

cause, via the display device, presentation of the first corrected image data;

detect a change from the first contextual information to second contextual information including at least one of second user information associated with the current state of a user of the computing system, second application information associated with a second application different from the first application being executed by the computing system, and second environment information associated with the current state of the physical environment; and in response to detecting the change from the first contextual information to the second contextual information;

select a second set of perspective correction operations different from the first set of perspective correction operations;

generate second corrected image data by performing the second set of perspective correction operations on the image data; and cause, via the display device, presentation of the second corrected image data.

15. The computing system of claim 14, wherein the one or more processors are to detect the change from the first contextual information to the second contextual information by:

storing a counter;

increasing or decreasing the counter based on at least one of the second user information, the second application information, and the second environment information; and detecting the change from the first contextual information to the second contextual information in response to the counter breaching a threshold.

16. The computing system of claim 14, wherein presentation of the second corrected image data occurs a transition time period after presentation of the first corrected image data, wherein the one or more processors are further to, at an intermediate time within the transition time period:

select an intermediate set of perspective correction operations a percentage between the first set of perspective correction operations and the second set of perspective correction operations;

generate intermediate corrected image data by performing the intermediate set of perspective correction operations on the image data; and cause, via the display device, presentation of the intermediate corrected image data.

17. The computing system of claim 16, wherein the percentage is based on the second user information indicating a change in head pose of the user.

18. A non-transitory memory storing one or more programs, which, when executed by one or more processors of a computing system with an interface for communicating with a display device and one or more image sensors, cause the computing system to:

obtain, via the one or more image sensors, image data associated with a physical environment;

obtain first contextual information including at least one of first user information associated with a current state of a user of the computing system, first application information associated with a first application being executed by the computing system, and first environment information associated with a current state of the physical environment;

select a first set of perspective correction operations based at least in part on the first contextual information;

generate first corrected image data by performing the first set of perspective correction operations on the image data;

cause, via the display device, presentation of the first corrected image datal;

detect a change from the first contextual information to second contextual information including at least one of second user information associated with the current state of a user of the computing system, second application information associated with a second application different from the first application being executed by the computing system, and second environment information associated with the current state of the physical environment; and in response to detecting the change from the first contextual information to the second contextual information;

select a second set of perspective correction operations different from the first set of perspective correction operations;

generate second corrected image data by performing the second set of perspective correction operations on the image data; and cause, via the display device, presentation of the second corrected image data.

\* \* \* \* \*